US012634790B2

(12) United States Patent
Choe et al.

(10) Patent No.: US 12,634,790 B2
(45) Date of Patent: May 19, 2026

(54) METHOD AND APPARATUS FOR SLICE AWARE CELL RESELECTION IN A WIRELESS COMMUNICATION SYSTEM

(71) Applicant: LG Electronics Inc., Seoul (KR)

(72) Inventors: Hyunjung Choe, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 657 days.

(21) Appl. No.: 17/852,823

(22) Filed: Jun. 29, 2022

(65) Prior Publication Data

US 2023/0131696 A1 Apr. 27, 2023

(30) Foreign Application Priority Data

Oct. 25, 2021 (KR) ......................... 10-2021-0143001

(51) Int. Cl.
*H04W 36/30* (2009.01)
(52) U.S. Cl.
CPC ................................. *H04W 36/302* (2023.05)
(58) Field of Classification Search
CPC . H04W 36/302; H04W 36/30; H04W 36/304; H04W 48/12; H04W 48/20
See application file for complete search history.

(56) References Cited

U.S. PATENT DOCUMENTS

| | | | | |
|---|---|---|---|---|
| 2023/0056855 A1* | 2/2023 | Jiang | ...................... | H04W 36/302 |
| 2023/0122460 A1* | 4/2023 | Jung | ...................... | H04W 36/16 |
| | | | | 370/331 |
| 2024/0121710 A1* | 4/2024 | Cheng | ...................... | H04W 48/18 |
| 2024/0276330 A1* | 8/2024 | Fujishiro | ...................... | H04W 36/0061 |
| 2024/0292297 A1* | 8/2024 | Liu | ...................... | H04W 48/20 |

OTHER PUBLICATIONS

3GPP TSG RAN WG2 Meeting #115e, R2-2108928 , 9th-27 [online resource] [retrieved on Sep. 9, 2021] Retrieved from TDoc_List_ Meeting_RAN2#115-e.xlsx (live.com), (hereafter referred as RAN2_ 115e) (Year: 2021).*
3GPP TSG RAN WG2 Meeting #115e, R2-2108928 , directory listing, https://www.3gpp.org/ftp/TSG_RAN/WG2_RL2/TSGR2_ 115-e/Docs (Year: 2021).*
3GPP TSG RAN WG2 Meeting #114-e, R2-2104740, May 19-27, 2021, (hereinafter, "RAN_114e")., https://www.3gpp.org/ftp/TSG_ RAN/WG2_RL2/TSGR2_114-e/Docs (Year: 2021).*
3GPP TSG RAN WG2 Meeting #114-e, R2-2104740, directory listing, https://www.3gpp.org/ftp/TSG_RAN/WG2_RL2/TSGR2_ 114-e/Docs (Year: 2021).*

(Continued)

*Primary Examiner* — Rebecca E Song
(74) *Attorney, Agent, or Firm* — Fish & Richardson P.C.

(57) ABSTRACT

A method and apparatus for slice-aware cell reselection in a wireless communication system is provided. A wireless device acquires network slice information. A wireless device performs slice-aware cell reselection based on both the network slice information and cell quality. Based on determining that a quality of a current cell is lower than or equal to a threshold value, a wireless device performs cell reselection based on only the cell quality.

4 Claims, 20 Drawing Sheets acquiring network slice information ~S1501 performing slice-aware cell reselection based on both the network slice information and cell quality ~S1502 performing cell reselection based on only the cell quality, based on determining that a quality of a current cell is lower than or equal to a threshold value ~S1503

(56) References Cited

OTHER PUBLICATIONS

3GPP TS 38.304 V15.6.0 (Dec. 2019) [hereafter referred to "3GPP_ 38.304", https://www.3gpp.org/ftp/Specs/archive/38_series/38.304/ (Year: 2021).*
3GPP TS 38.304 V15.6.0 (Dec. 2019) , directory listing, https://www.3gpp.org/ftp/Specs/archive/38_series/38.304/ (Year: 2021).*
3GPP TS 05.08 V8.23.0 (Nov. 2005) [hereafter referred to "3GPP_ 0508"], https://atisorg.s3.amazonaws.com/archive/3gpp-documents/ Rel99-14/ATIS.3GPP.05.08V8230-2006.pdf (Year: 2021).*
3GPP TSG RAN WG2 Meeting #113-e, R2-2100489, Jan. 25-Feb. 5, 2021 (hereinafter, RAN_113e) , https://www.3gpp.org/ftp/TSG_ RAN/WG2_RL2/TSGR2_113-e/Docs (Year: 2021).*
3GPP TSG RAN WG2 Meeting #113-e, R2-2100489, directory listing, https://www.3gpp.org/ftp/TSG_RAN/WG2_RL2/TSGR2_ 113-e/Docs (Year: 2021).*
3GPP TS 25.304 version 12.6.0, (Jul. 2015), https://www.etsi.org/ deliver/etsi_ts/125300_125399/125304/12.06.00_60/ts_ 125304v120600p.pdf (Year: 2021).*
3GPP TS 36.304 v16.5.0 (Sep. 2021), "3rd Generation Partnership Project; Technical Specification Group Radio Access Network; Evolved Universal Terrestrial Radio Access (E-UTRA); User Equipment (UE) procedures in idle mode (Release 16)," Sep. 2021, 64 pages.
3GPP TS 38.300 V16.7.0 (Sep. 2021), "3rd Generation Partnership Project; Technical Specification Group Radio Access Network; NR; NR and NG-RAN Overall Description; Stage 2 (Release 16)," Sep. 2021, 152 pages.
3GPP TS 38.331 V16.6.0 (Sep. 2021), "3rd Generation Partnership Project; Technical Specification Group Radio Access Network; NR; Radio Resource Control (RRC) protocol specification (Release 16)," Sep. 2021, 961 pages.

* cited by examiner

Figure 3:
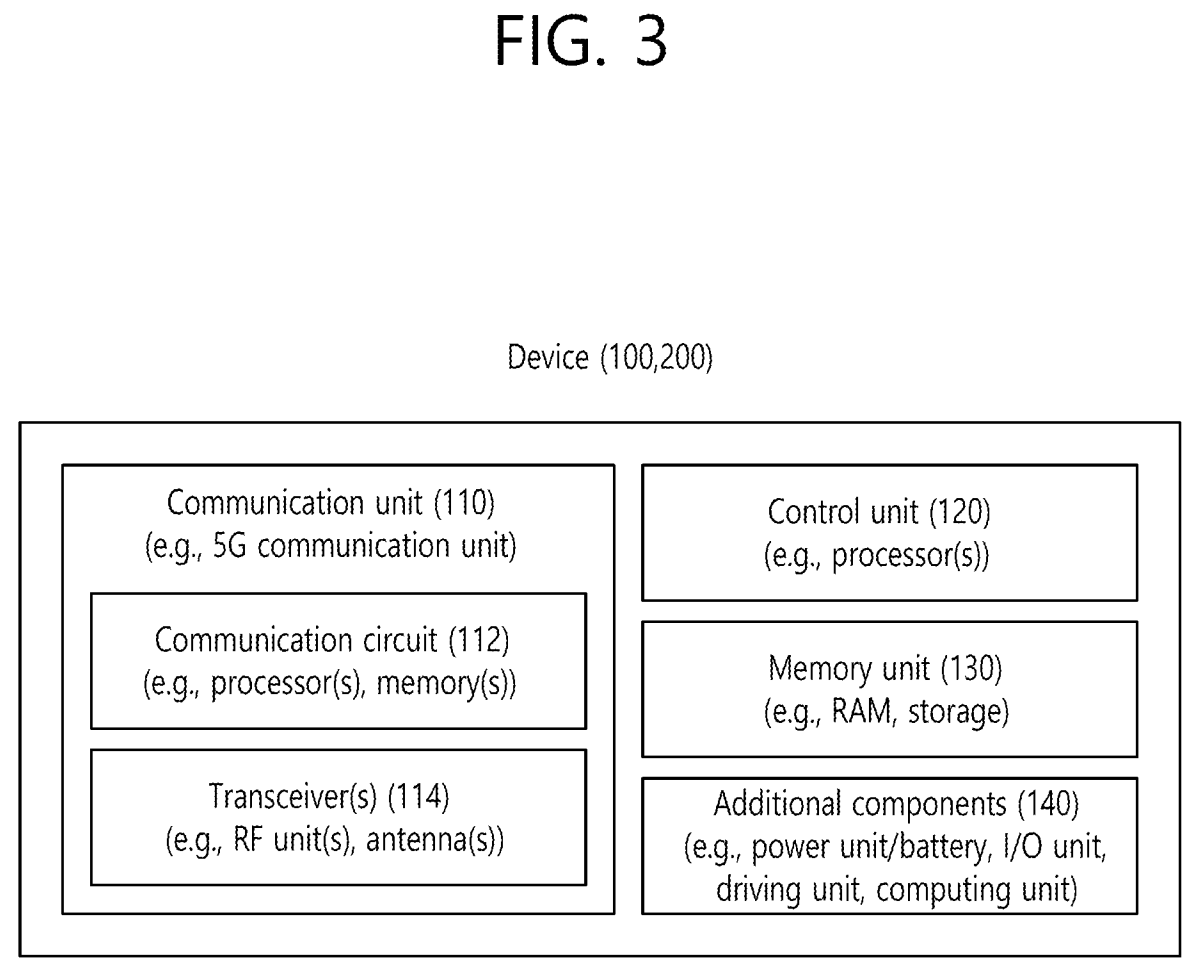

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 14

| |
|---|
| Slice#1 — freq a ⋮ freq b |
| Slice#2 — freq c ⋮ freq d |
| ⋮ |
| Slice#5 — freq e ⋮ freq f |

FIG. 16

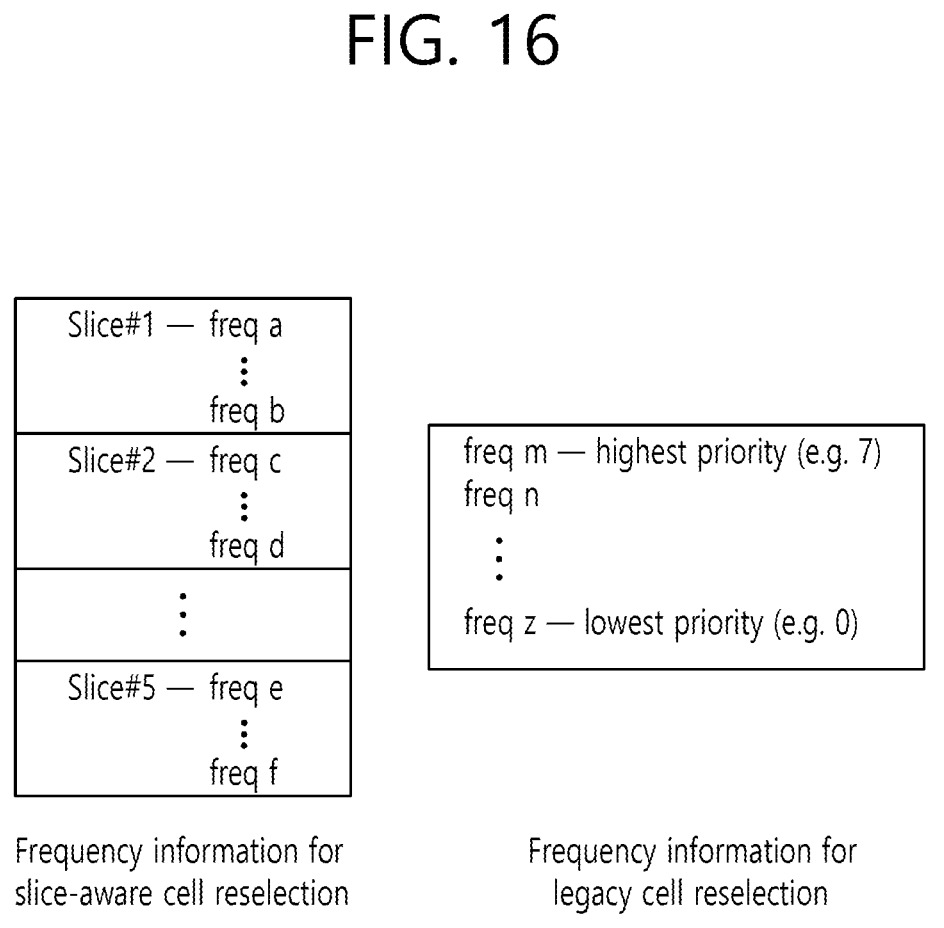

| Slice#1 — freq a<br>⋮<br>freq b |
|---|
| Slice#2 — freq c<br>⋮<br>freq d |
| ⋮ |
| Slice#5 — freq e<br>⋮<br>freq f |

Frequency information for
slice-aware cell reselection freq m — highest priority (e.g. 7)
freq n

⋮ freq z — lowest priority (e.g. 0)

Frequency information for
legacy cell reselection

FIG. 18

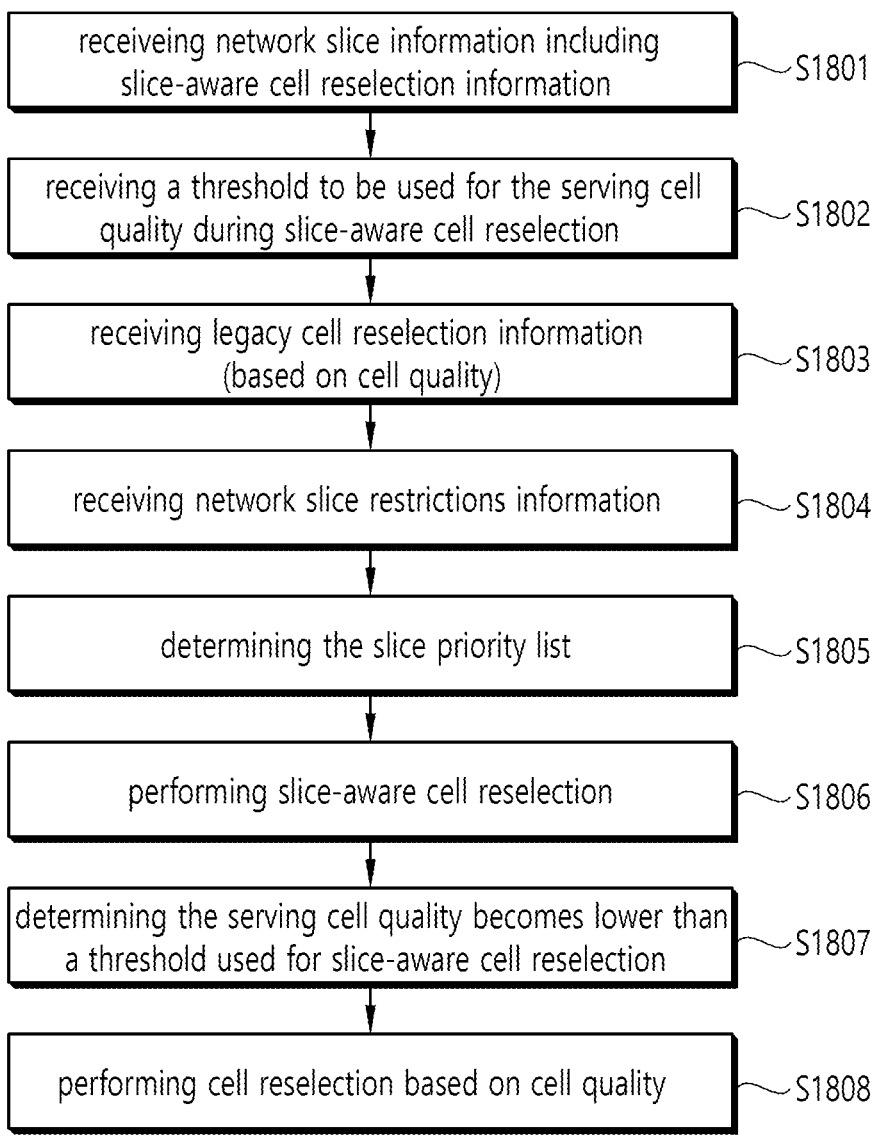

receiveing network slice information including
slice-aware cell reselection information ── S1801 receiving a threshold to be used for the serving cell
quality during slice-aware cell reselection ── S1802 receiving legacy cell reselection information
(based on cell quality) ── S1803 receiving network slice restrictions information ── S1804 determining the slice priority list ── S1805 performing slice-aware cell reselection ── S1806 determining the serving cell quality becomes lower than
a threshold used for slice-aware cell reselection ── S1807 performing cell reselection based on cell quality ── S1808

FIG. 19

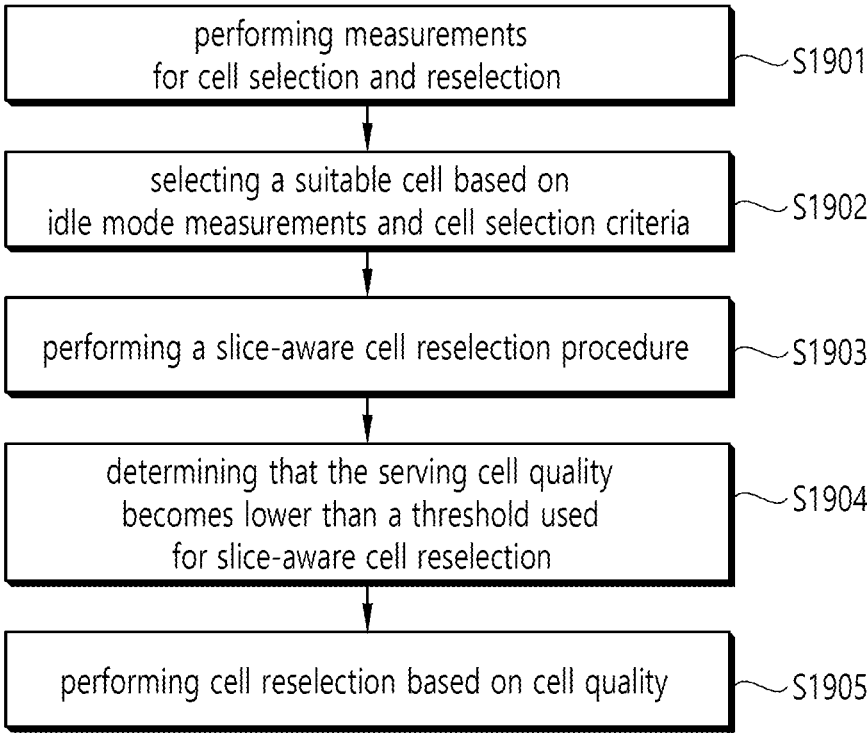

performing measurements
for cell selection and reselection — S1901 selecting a suitable cell based on
idle mode measurements and cell selection criteria — S1902 performing a slice-aware cell reselection procedure — S1903 determining that the serving cell quality
becomes lower than a threshold used
for slice-aware cell reselection — S1904 performing cell reselection based on cell quality — S1905

METHOD AND APPARATUS FOR SLICE AWARE CELL RESELECTION IN A WIRELESS COMMUNICATION SYSTEM

CROSS-REFERENCE TO RELATED APPLICATIONS

Pursuant to 35 U.S.C. § 119(a), this application claims the benefit of Korean Patent Application No. 10-2021-0143001, filed on Oct. 25, 2021, the contents of which are hereby incorporated by reference in their entirety.

BACKGROUND

Technical Field

The present disclosure relates to a method and apparatus for slice-aware cell reselection in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Technical Objects

In NR, the "slice info" (for a single slice or slice group) may be provided to the UE using both broadcast and dedicated signaling. The "slice info" may be provided for the serving frequency as well as neighboring frequencies.

In addition, in NR, slice-aware cell reselection may be supported. For example, UE performs slice-aware cell reselection to find a suitable cell for each slice (or slice group) in the slice list received from the NAS.

Since the UE performs measurement on the frequencies only in the slice list during slice-aware cell reselection, if the serving cell quality becomes lower than a threshold, the UE could transition to Any Cell state, unless the UE finds a suitable cell during the slice-aware cell reselection.

If the UE fails to find a suitable cell during slice-aware cell reselection and transition to Any Cell status, the UE should search for a cell without slice information and may perform measurement from a cold start.

Therefore, studies for slice-aware cell reselection based on cell quality may be required.

Technical Solutions

In an aspect, a method performed by a wireless device in a wireless communication system is provided. A wireless device acquires network slice information. A wireless device performs slice-aware cell reselection based on both the network slice information and cell quality. Based on determining that a quality of a current cell is lower than or equal to a threshold value, a wireless device performs cell reselection based on only the cell quality.

In another aspect, an apparatus for implementing the above method is provided.

Technical Effects

The present disclosure can have various advantageous effects.

According to some embodiments of the present disclosure, a wireless device could perform slice-aware cell reselection efficiently by considering the cell quality of the current cell.

For example, while performing the slice-aware cell reselection, if the cell quality of the current cell becomes lower than a threshold value, the wireless device could perform cell reselection regardless of the network slice. Thus, the wireless device could avoid to transition to the Any Cell state. Therefore, the wireless device could save time and power for the cell reselection procedure.

In other words, according to some embodiments of the present disclosure, the wireless device may perform measurement using the frequencies for slice-aware cell reselection and the frequencies for legacy cell reselection, if the serving cell quality is lower than a threshold.

That is, the wireless device could find a suitable based on cell quality regardless of the network slice, during slice-aware cell reselection, before entering into the Any Cell state. Therefore, the wireless device could save power consumption by avoiding the cold start measurement.

In addition, the wireless device could save the time for searching cell in the Any Cell selection. In other words, the wireless device could reduce the latency to be consumed for cell search in the Any Cell selection.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 3 shows an example of a wireless device to which implementations of the present disclosure is applied.

FIG. 14 shows an example of a network slice list for explaining the slice-aware cell reselection.

FIG. 16 shows an example of frequency information for slice-aware cell reselection and frequency information for legacy cell reselection.

FIG. 18 shows an example of UE operations for a slice-aware cell reselection procedure.

FIG. 19 shows another example of UE operations for slice-aware cell reselection.

DETAILED DESCRIPTION

Figure 2:
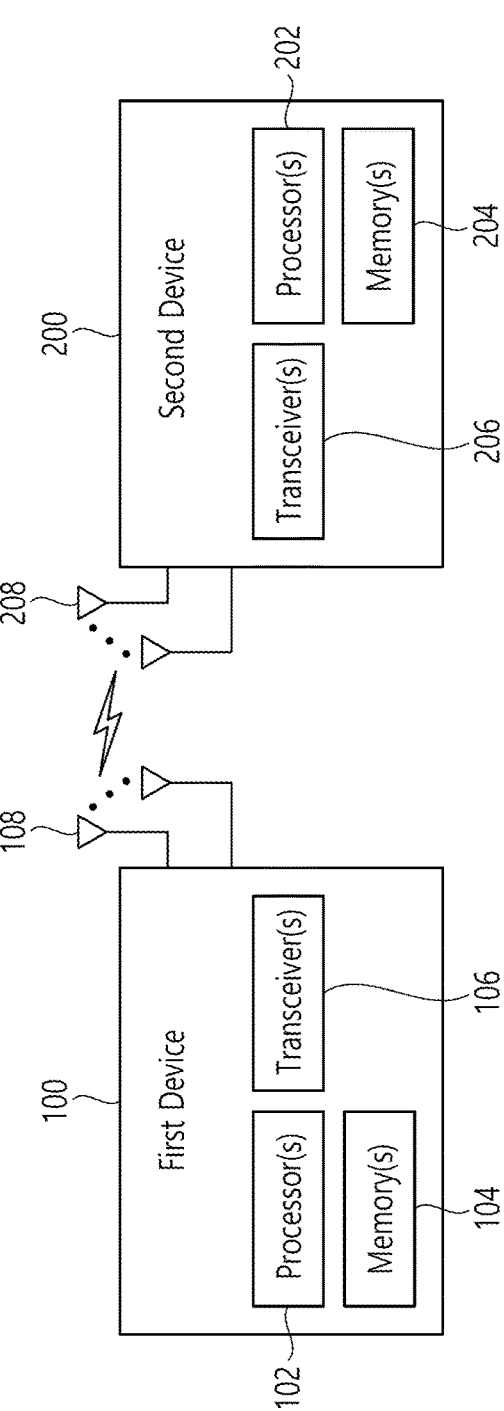
FIG. 2 shows an example of wireless devices to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
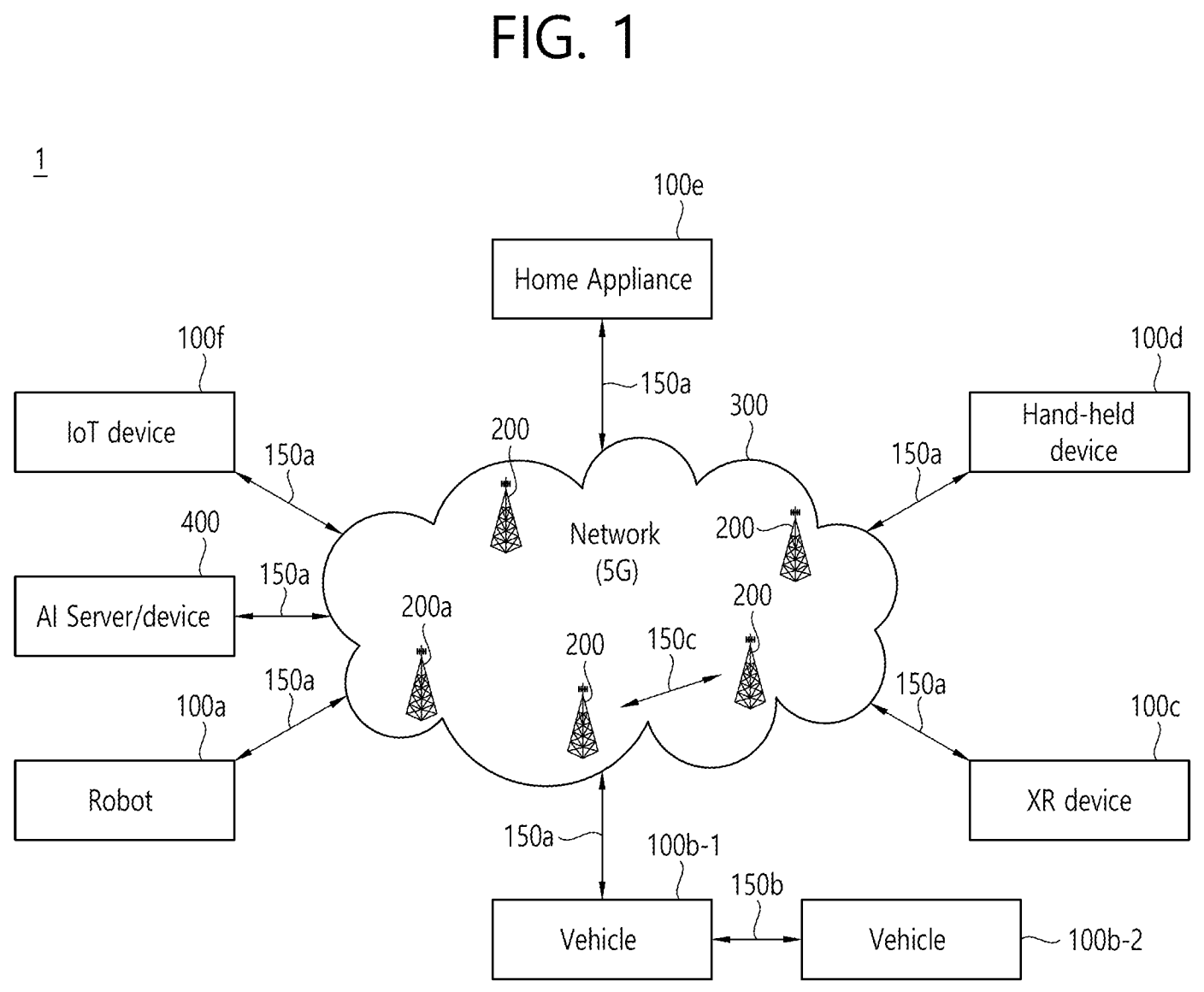

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration.

For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system.

The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (TAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory (s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
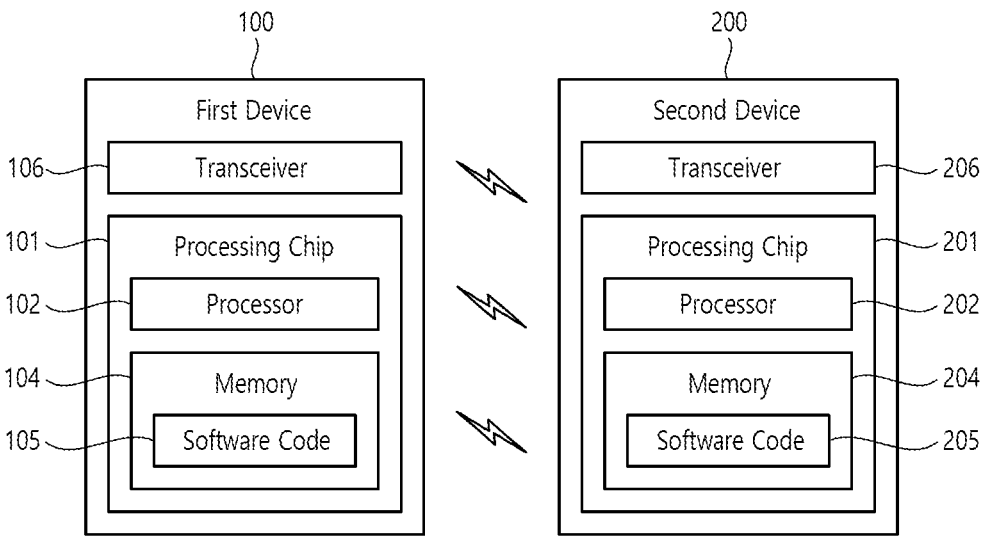
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
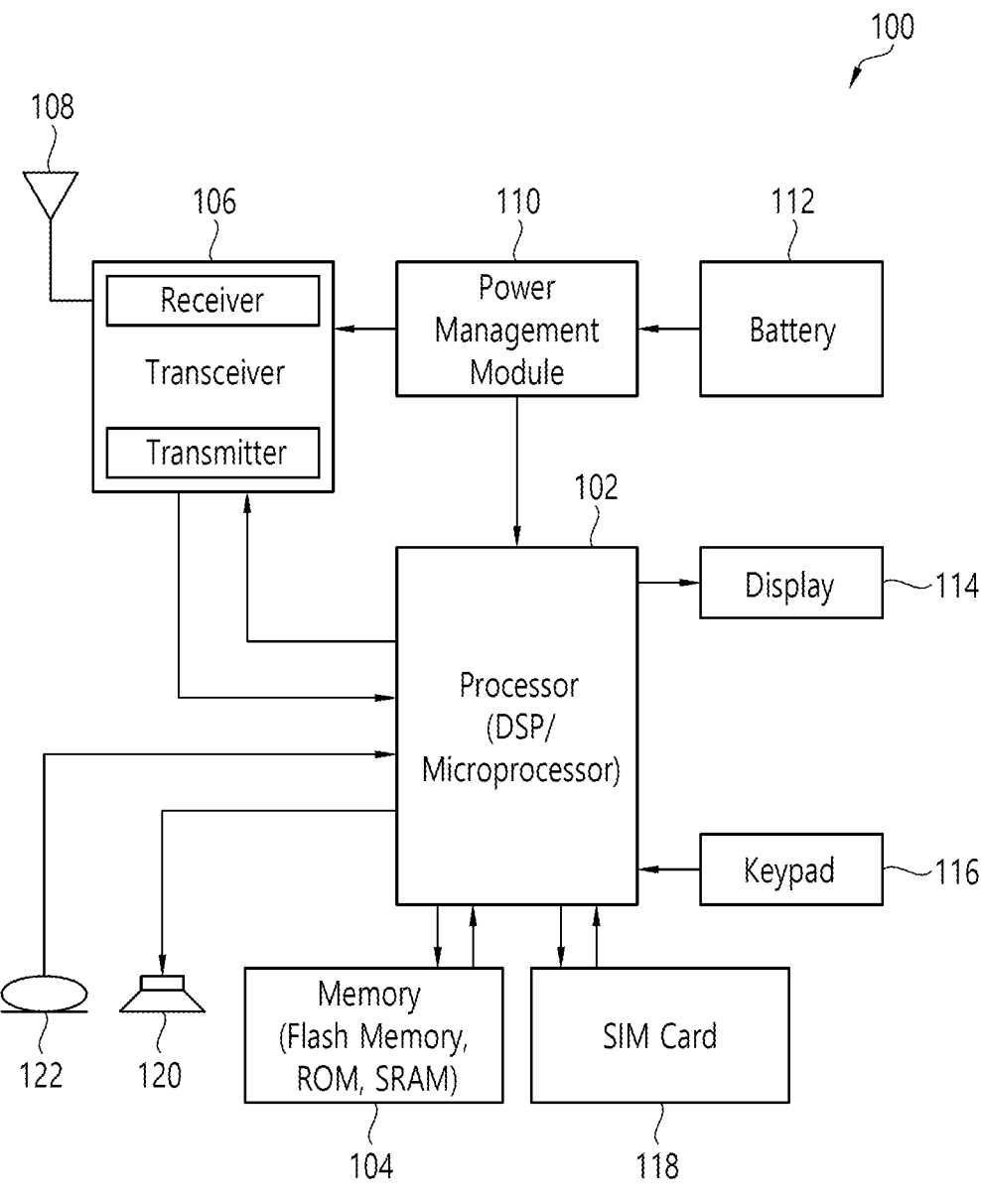
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON' series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
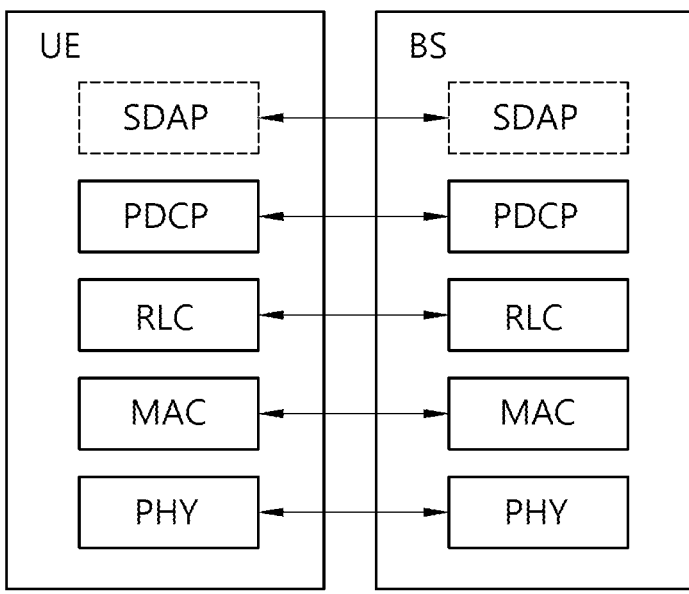
FIGS. 6 and 7 show an example of protocol stacks in a 3GPP based wireless communication system to which implementations of the present disclosure is applied.
Figure 7:
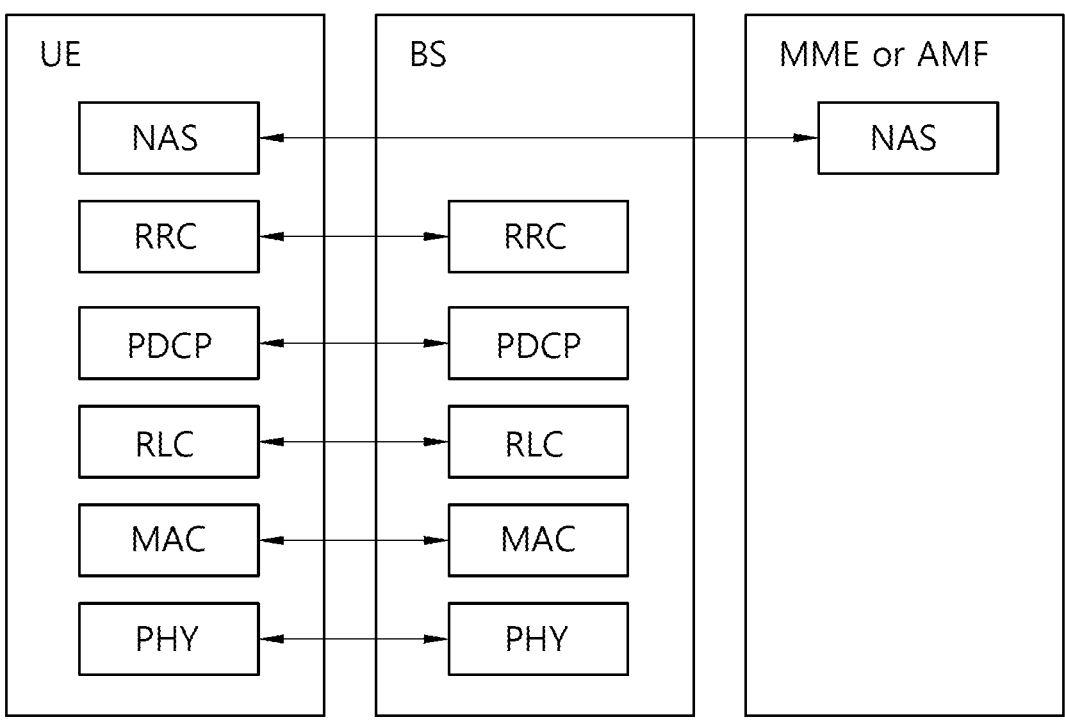

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
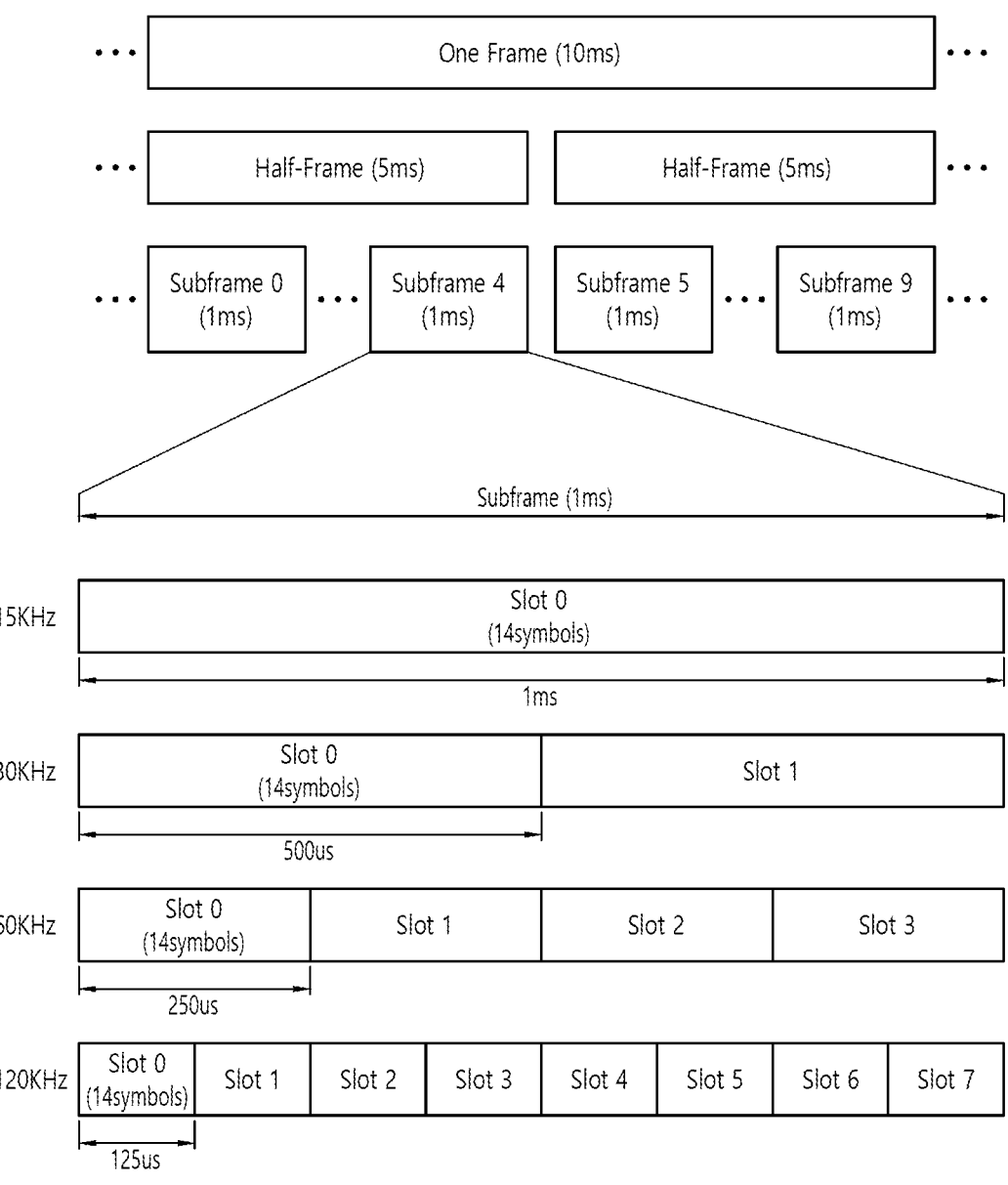
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
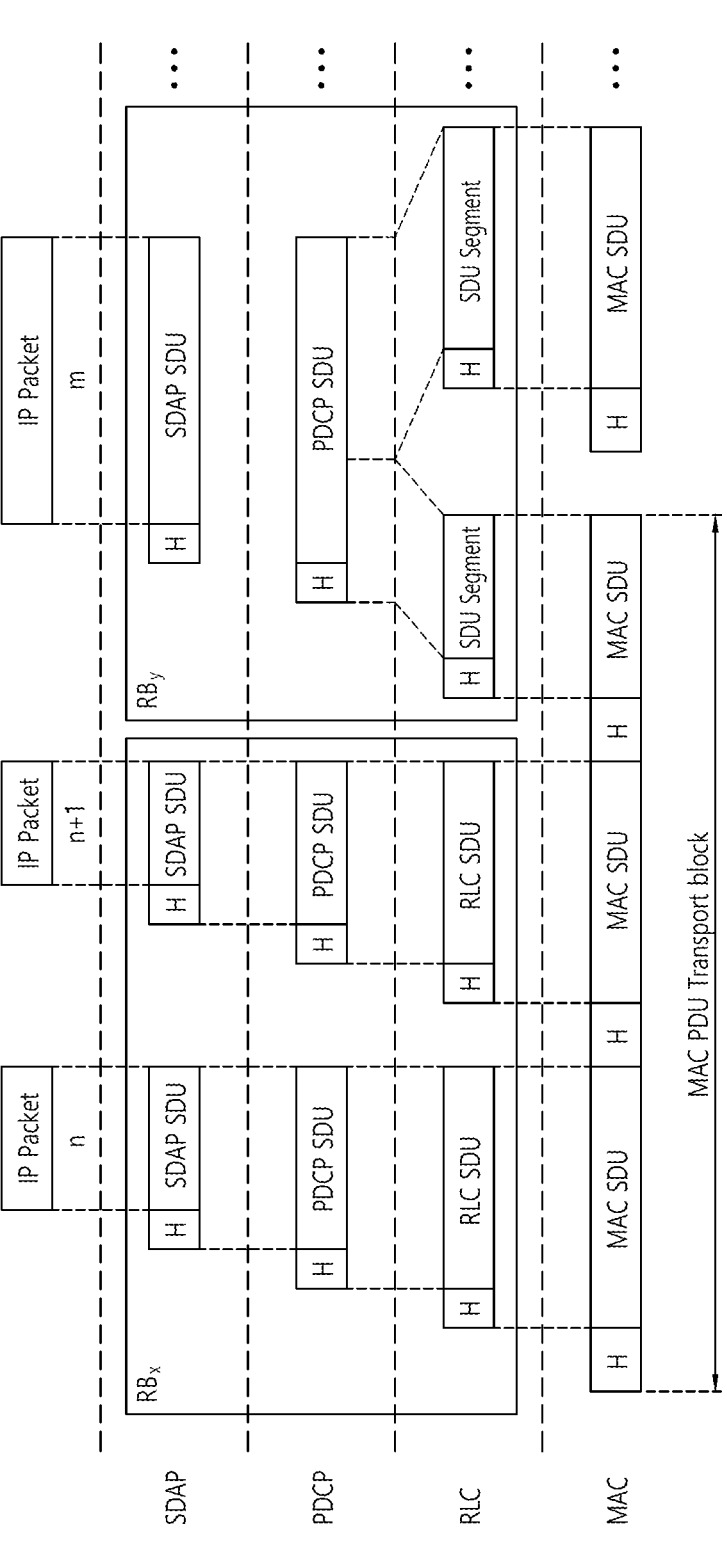
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, technical features related to network slicing are described. Section 16.3 of 3GPP TS 38.300 v16.7.0 may be referred.

In this clause, the general principles and requirements related to the realization of network slicing in the NG-RAN for NR connected to 5GC and for E-UTRA connected to 5GC are given.

A network slice always consists of a RAN part and a CN part. The support of network slicing relies on the principle that traffic for different slices is handled by different PDU sessions. Network can realise the different network slices by scheduling and also by providing different L1/L2 configurations.

Each network slice is uniquely identified by an S-NSSAI. NSSAI (Network Slice Selection Assistance Information) includes one or a list of S-NSSAIs (Single NSSAI) where an S-NSSAI is a combination of:

mandatory SST (Slice/Service Type) field, which identifies the slice type and consists of 8 bits (with range is 0-255);

optional SD (Slice Differentiator) field, which differentiates among Slices with same SST field and consist of 24 bits.

The list includes at most 8 S-NSSAI(s).

The UE provides NSSAI (Network Slice Selection Assistance Information) for network slice selection in RRCSetupComplete, if it has been provided by NAS. While the network can support large number of slices (hundreds), the UE need not support more than 8 slices simultaneously. A BL UE or a NB-IoT UE supports a maximum of 8 slices simultaneously.

Network Slicing is a concept to allow differentiated treatment depending on each customer requirements. With slicing, it is possible for Mobile Network Operators (MNO) to consider customers as belonging to different tenant types with each having different service requirements that govern in terms of what slice types each tenant is eligible to use based on Service Level Agreement (SLA) and subscriptions.

Operations related to AMF and NW Slice Selection are described.

CN-RAN interaction and internal RAN aspects

NG-RAN selects AMF based on a Temp ID or NSSAI provided by the UE over RRC. The mechanisms used in the RRC protocol are described in the next clause.

Table 5 shows an example of AMF selection based on Temp ID and NSSAI.

TABLE 5

| Temp ID | NSSAI | AMF Selection by NG-RAN |
| --- | --- | --- |
| not available or invalid | not available | One of the default AMFs is selected (NOTE) |
| not available or invalid | present | Selects AMF which supports UE requested slices |
| valid | not available, or present | Selects AMF per CN identity information in Temp ID |

The set of default AMFs is configured in the NG-RAN nodes via OAM.

Operations related to Resource Isolation and Management are described.

Resource isolation enables specialized customization and avoids one slice affecting another slice.

Hardware/software resource isolation is up to implementation. Each slice may be assigned with either shared or dedicated radio resource up to RRM implementation and SLA.

To enable differentiated handling of traffic for network slices with different SLA:

NG-RAN is configured with a set of different configurations for different network slices by OAM;

To select the appropriate configuration for the traffic for each network slice, NG-RAN receives relevant information indicating which of the configurations applies for this specific network slice.

Operations related to AMF and NW Slice Selection are described.

RAN selects the AMF based on a Temp ID or NSSAI provided by the UE.

Figure 10:
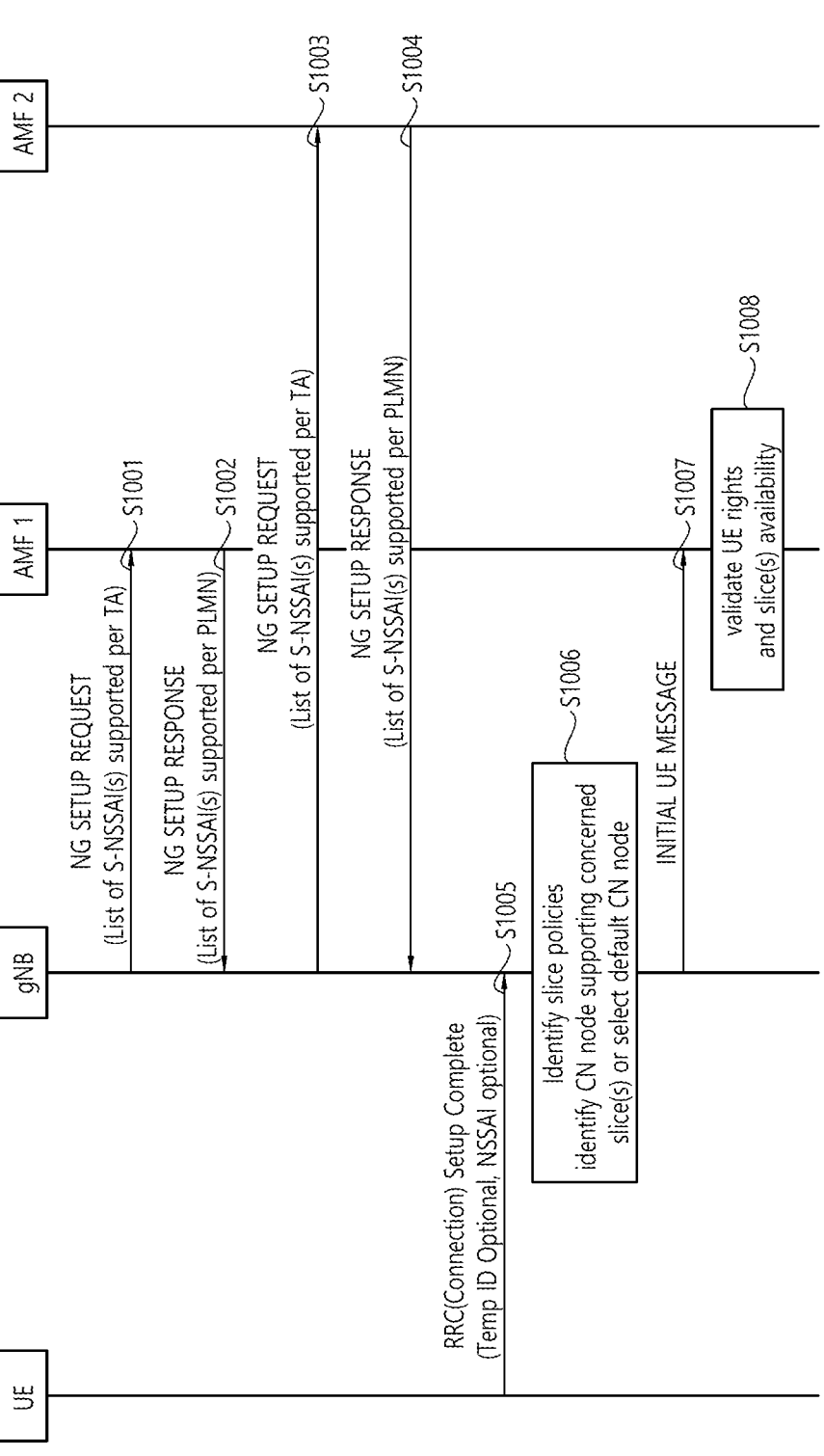
FIG. 10 shows an example of AMF selection to which implementations of the present disclosure is applied.

FIG. 10 shows an example of AMF selection to which implementations of the present disclosure is applied.

In case a Temp ID is not available, the NG-RAN uses the NSSAI provided by the UE at RRC connection establishment to select the appropriate AMF (the information is provided after MSG3 of the random access procedure). If such information is also not available, the NG-RAN routes the UE to one of the configured default AMF(s).

The NG-RAN uses the list of supported S-NSSAI(s) previously received in the NG Setup Response message when selecting the AMF with the NSSAI. This list may be updated via the AMF Configuration Update message.

In step S1001, gNB may transmit, to AMF1, an NG SETUP REQUEST message including list of S-NSSAI(s) supported per TA. In step S1002, gNB may receive, from AMF1 and AMF2, an NG SETUP REQUEST including list of S-NSSAI(s) supported per PLMN. In step S1003, gNB may transmit, to AMF2, an NG SETUP REQUEST message including list of S-NSSAI(s) supported per TA. In step S1004, gNB may receive, from AMF2, an NG SETUP REQUEST including list of S-NSSAI(s) supported per PLMN. In step S1005, gNB may receive, from UE, an RRC (Connection) Setup Complete message including Temp ID (optional) and NSSAI (optional). In step S1006, gNB may identify slice policies, identify CN node supporting concerned slice(s), or select default CN node. In step S1007, gNB may transmit, to AMF1, an INITIAL UE message. In step S1008, gNB may validate UE rights and slice(s) availability.

UE Context Handling is described

Figure 11:
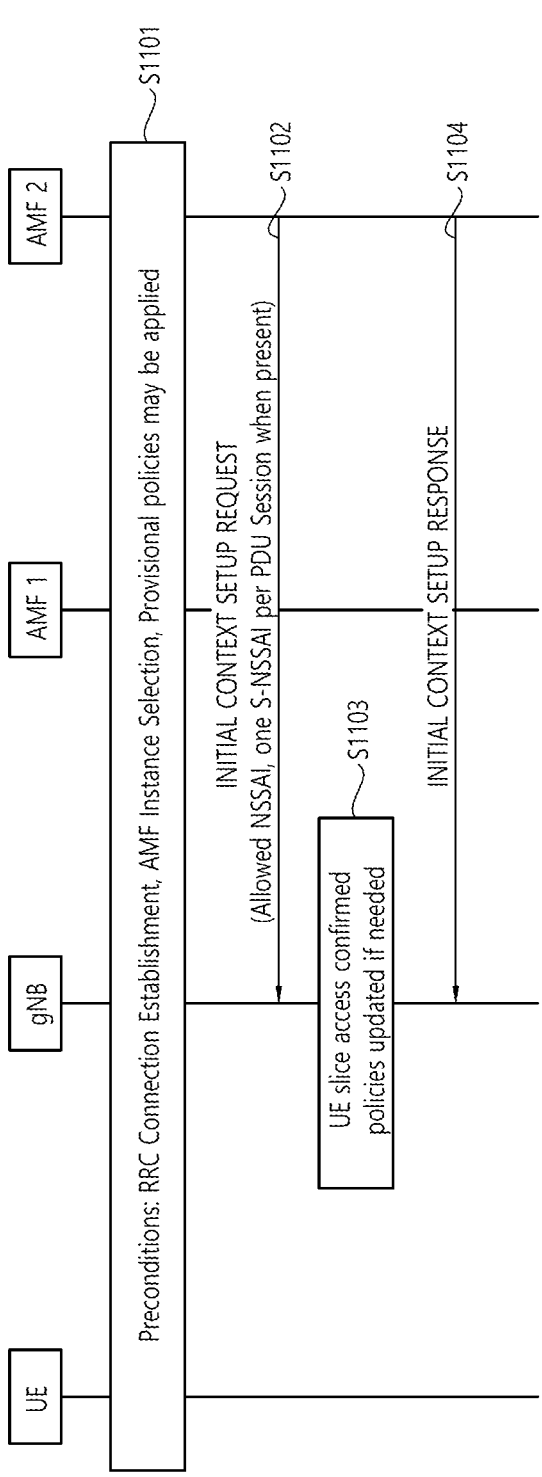
FIG. 11 shows an example of Network Slice-aware Initial Context Setup to which implementations of the present disclosure is applied.

FIG. 11 shows an example of Network Slice-aware Initial Context Setup to which implementations of the present disclosure is applied.

Following the initial access, the establishment of the RRC connection and the selection of the correct AMF, the AMF establishes the complete UE context by sending the Initial Context Setup Request message to the NG-RAN over NG-C. The message contains the Allowed NSSAI and additionally contains the S-NSSAI(s) as part of the PDU session(s) resource description when present in the message. Upon successful establishment of the UE context and allocation of PDU session resources to the relevant network slice(s) when present, the NG-RAN responds with the Initial Context Setup Response message.

In step S1101, as preconditions, RRC Connection establishment, AMF Instance selection, Provisional policies may be applied. In step S1102, AMF2 (or AMF1) may transmit, to gNB, an initial context setup request message including allowed NSSAI and/or one S-NSSAI per PDU session when present. In step S1103, in gNB, UE slice access may be confirmed, and policies may be updated if needed. In step S1104, gNB may transmit, to the AMF2 (or AMF1), an initial context setup response message.

Hereinafter, technical features related to Master Information Block (MIB) are described. All or a part of section 5.2.2.4 of 3GPP TS 38.331 v16.6.0 may be referred.

Actions upon reception of the MIB are described.

Upon receiving the MIB the UE shall:

1> store the acquired MIB;

1> if the UE is in RRC_IDLE or in RRC_INACTIVE, or if the UE is in RRC_CONNECTED while T311 is running:

2> if the cellBarred in the acquired MIB is set to barred:

3> consider the cell as barred;

3> perform cell re-selection to other cells on the same
   frequency as the barred cell;
2> else:
3> apply the received systemFrameNumber, pdcch-Con-
   figSIB1, subCarrierSpacingCommon, ssb-Subcarrier-
   Offset and dmrs-TypeAPosition.
Hereinafter, technical features related to cell selection and
reselection are described. Section 5.2 of 3GPP TS 36.304
v16.5.0 may be referred.

UE shall perform measurements for cell selection and
reselection purposes.

The NAS can control the RAT(s) in which the cell
selection should be performed, for instance by indicating
RAT(s) associated with the selected PLMN, and by main-
taining a list of forbidden registration area(s) and a list of
equivalent PLMNs. The UE shall select a suitable cell based
on idle mode measurements and cell selection criteria.

In order to speed up the cell selection process, stored
information for several RATs may be available in the UE.

When camped on a cell, the UE shall regularly search for
a better cell according to the cell reselection criteria. If a
better cell is found, that cell is selected. The change of cell
may imply a change of RAT, or if the current and selected
cell are both E-UTRA cells, a change of the CN type.

The NAS is informed if the cell selection and reselection
results in changes in the received system information rel-
evant for NAS.

States and state transitions in Idle Mode is described.

Figure 12:
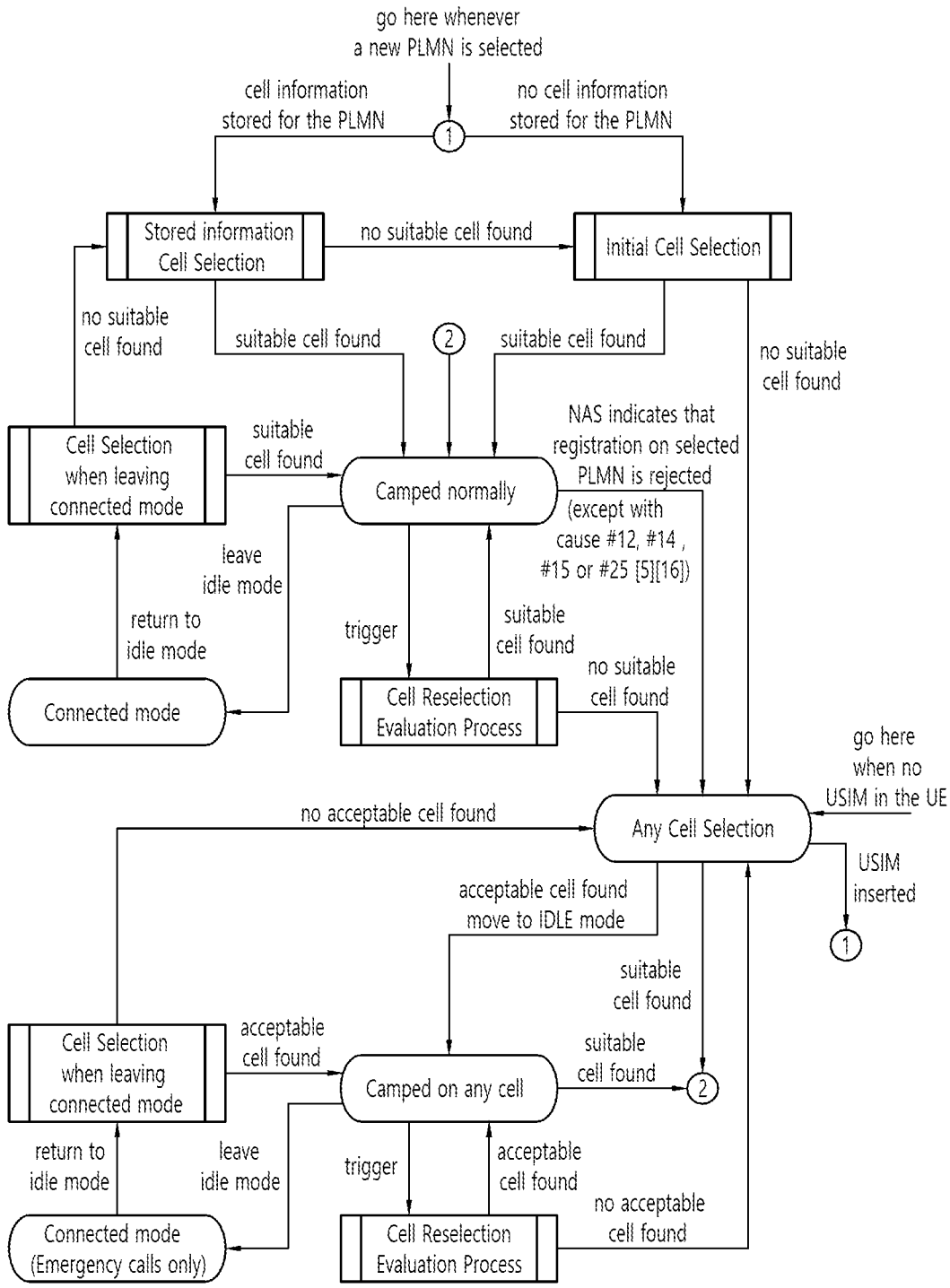
FIG. 12 shows the states and state transitions and procedures in RRC_IDLE, except for NB-IoT, to which implementations of the present disclosure is applied.

FIG. 12 shows the states and state transitions and proce-
dures in RRC_IDLE, except for NB-IoT, to which imple-
mentations of the present disclosure is applied.

In FIG. 12, whenever a new PLMN selection is per-
formed, it causes an exit to number 1.

Figure 13:
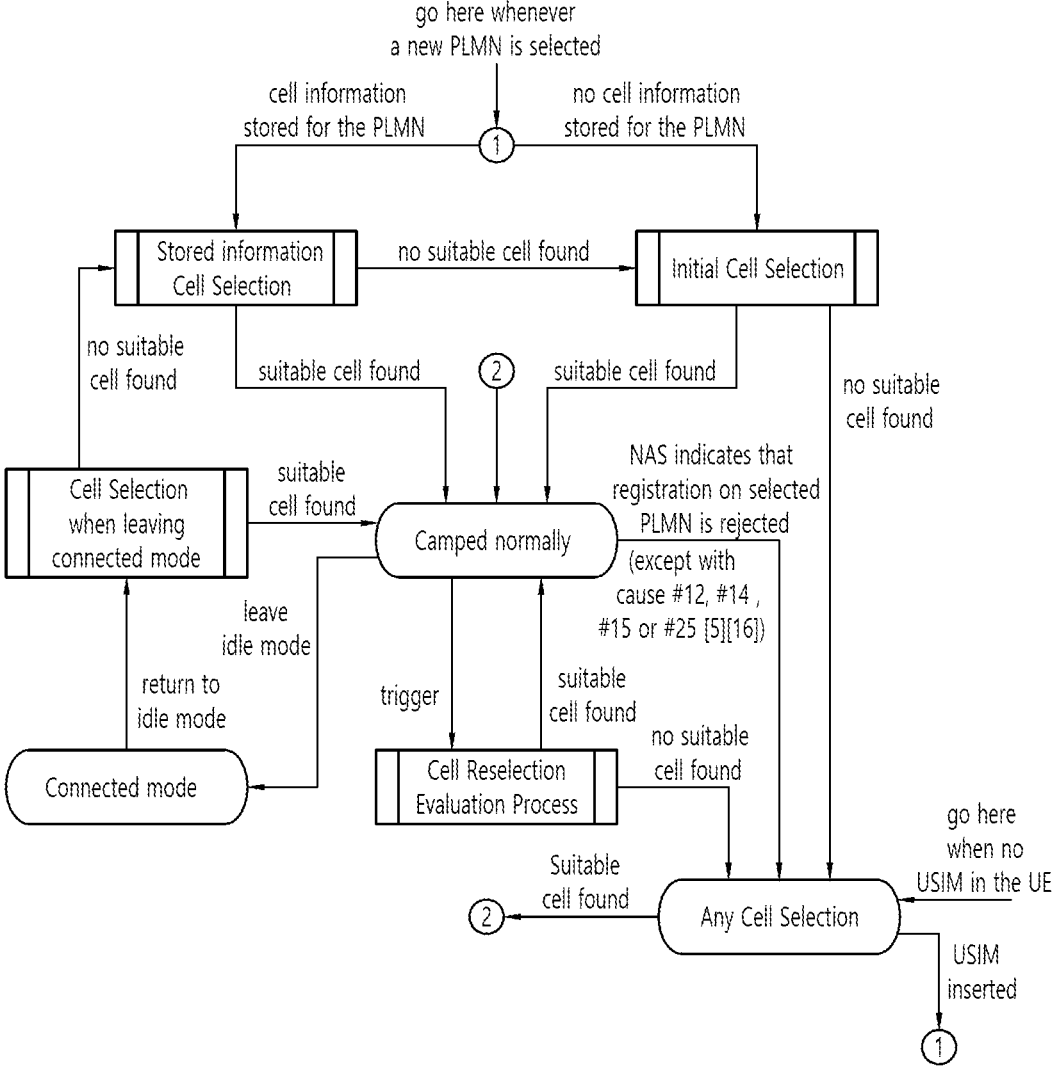
FIG. 13 shows the states and state transitions and procedures in RRC_IDLE, for NB-IoT, to which implementations of the present disclosure is applied.

FIG. 13 shows the states and state transitions and proce-
dures in RRC_IDLE, for NB-IoT, to which implementations
of the present disclosure is applied.

In FIG. 13 whenever a new PLMN selection is performed,
it causes an exit to number 1.

Cell Selection process is described.

The UE shall use one of the following two cell selection
procedures:
a) Initial Cell Selection This procedure requires no prior knowledge of which RF
channels are E-UTRA or NB-IoT carriers. The UE shall scan
all RF channels in the E-UTRA bands according to its
capabilities to find a suitable cell. On each carrier frequency,
the UE need only search for the strongest cell. Once a
suitable cell is found this cell shall be selected.
b) Stored Information Cell Selection This procedure requires stored information of carrier
frequencies and optionally also information on cell param-
eters, from previously received measurement control infor-
mation elements or from previously detected cells. Once the
UE has found a suitable cell the UE shall select it. If no
suitable cell is found the Initial Cell Selection procedure
shall be started.

Hereinafter, cell reselection evaluation process is
described.

Reselection priorities handling is described.

Absolute priorities of different NR frequencies or inter-
RAT frequencies may be provided to the UE in the system
information, in the RRCRelease message, or by inheriting
from another RAT at inter-RAT cell (re)selection. In the case
of system information, an NR frequency or inter-RAT fre-
quency may be listed without providing a priority (i.e. the
field cellReselectionPriority is absent for that frequency). If
priorities are provided in dedicated signalling, the UE shall ignore all the priorities provided in system information. If
UE is in camped on any cell state, UE shall only apply the
priorities provided by system information from current cell,
and the UE preserves priorities provided by dedicated sig-
nalling and deprioritisationReq received in RRCRelease
unless specified otherwise. When the UE in camped nor-
mally state, has only dedicated priorities other than for the
current frequency, the UE shall consider the current fre-
quency to be the lowest priority frequency (i.e. lower than
any of the network configured values). If the UE is config-
ured to perform both NR sidelink communication and V2X
sidelink communication, the UE may consider the frequency
providing both NR sidelink communication configuration
and V2X sidelink communication configuration to be the
highest priority. If the UE is configured to perform NR
sidelink communication and not perform V2X communica-
tion, the UE may consider the frequency providing NR
sidelink communication configuration to be the highest
priority. If the UE is configured to perform V2X sidelink
communication and not perform NR sidelink communica-
tion, the UE may consider the frequency providing V2X
sidelink communication configuration to be the highest
priority.

The UE shall only perform cell reselection evaluation for
NR frequencies and inter-RAT frequencies that are given in
system information and for which the UE has a priority
provided.

In case UE receives RRCRelease with deprioritisation-
Req, UE shall consider current frequency and stored fre-
quencies due to the previously received RRCRelease with
deprioritisationReq or all the frequencies of NR to be the
lowest priority frequency (i.e. lower than any of the network
configured values) while T325 is running irrespective of
camped RAT. The UE shall delete the stored deprioritisation
request(s) when a PLMN selection or SNPN selection is
performed on request by NAS.

Operations related to cells with cell reservations, access
restrictions or unsuitable for normal camping are described.

For the highest ranked cell (including serving cell)
according to cell reselection criteria, for the best cell accord-
ing to absolute priority reselection criteria, the UE shall
check if the access is restricted according to the rules.

If that cell and other cells have to be excluded from the
candidate list, the UE shall not consider these as candidates
for cell reselection. This limitation shall be removed when
the highest ranked cell changes.

If the highest ranked cell or best cell according to absolute
priority reselection rules is an intra-frequency or inter-
frequency cell which is not suitable due to one or more of the
following reasons:
   this cell belongs to a PLMN which is not indicated as
      being equivalent to the registered PLMN, or
   this cell is a CAG cell that belongs to a PLMN which is
      equivalent to the registered PLMN but with no CAG-
      ID that is present in the UE's allowed CAG list being
      broadcasted, or
   this cell is not a CAG cell and the CAG-only indication
      in the UE is set, or
   this cell does not belong to a SNPN that is equal to the
      registered or selected SNPN of the UE in SNPN access
      mode,
   the UE shall not consider this cell and, for operation in
licensed spectrum, other cells on the same frequency as
candidates for reselection for a maximum of 300 seconds.

NR Inter-frequency and inter-RAT Cell Reselection cri-
teria are described.

If threshServingLowQ is broadcast in system information and more than 1 second has elapsed since the UE camped on the current serving cell, cell reselection to a cell on a higher priority NR frequency or inter-RAT frequency than the serving frequency shall be performed if:

A cell of a higher priority NR or EUTRAN RAT/frequency fulfils Squal >Threshx, HighQ during a time interval TreselectionRAT Otherwise, cell reselection to a cell on a higher priority NR frequency or inter-RAT frequency than the serving frequency shall be performed if:

A cell of a higher priority RAT/frequency fulfils Srxlev>Thresh$_{X, HighP}$ during a time interval Treselection$_{RAT}$; and More than 1 second has elapsed since the UE camped on the current serving cell.

Cell reselection to a cell on an equal priority NR frequency shall be based on ranking for intra-frequency cell reselection.

Cell reselection to a higher priority RAT/frequency shall take precedence over a lower priority RAT/frequency if multiple cells of different priorities fulfil the cell reselection criteria.

Intra-frequency and equal priority inter-frequency Cell Reselection criteria are described.

The cell-ranking criterion $R_s$ for serving cell and $R_n$ for neighbouring cells is defined by:

$$R_s=Q_{meas,s}+Q_{hyst}-Qoffset_{temp}$$

$$R_n=Q_{meas,n}-Qoffset-Qoffset_{temp}$$

Table 6 shows the variables for the cell Reselection criteria.

TABLE 6

| $Q_{meas}$ | RSRP measurement quantity used in cell reselections. |
|---|---|
| Qoffset | Far intra-frequency: Equals to Qoffset$_{s, n}$, if Qoffset$_{s, n}$ is valid, otherwise this equals to zero.<br>For inter-frequency: Equals to Qoffset$_{s, n}$ plus Qoffset$_{frequency}$, if Qoffset$_{s, n}$ is valid, otherwise this equals to Qoffset$_{frequency}$. |
| Qoffset$_{temp}$ | Offset temporarily applied to a cell. |

The UE shall perform ranking of all cells that fulfil the cell selection criterion S.

The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the highest ranked cell. If this cell is found to be not-suitable, the UE shall behave operations related to cells with cell reservations, access restrictions or unsuitable for normal camping, as below.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them. If this cell is found to be not-suitable, the UE shall behave operations related to cells with cell reservations, access restrictions or unsuitable for normal camping, as below.

In all cases, the UE shall reselect the new cell, only if the following conditions are met:

the new cell is better than the serving cell according to the cell reselection criteria specified above during a time interval Treselection$_{RAT}$;

more than 1 second has elapsed since the UE camped on the current serving cell.

Technical features related to Camped Normally state are described.

This state is applicable for RRC_IDLE and RRC_INACTIVE state.

When camped normally, the UE shall perform the following tasks:

monitor the paging channel of the cell according to information broadcast in SIB1;

monitor Short Messages transmitted with P-RNTI over DCI;

monitor relevant System Information;

perform necessary measurements for the cell reselection evaluation procedure;

execute the cell reselection evaluation process on the following occasions/triggers:

1) UE internal triggers, so as to meet performance;

2) When information on the BCCH used for the cell reselection evaluation procedure has been modified.

Technical features related to selection of cell at transition to RRC_IDLE or RRC_INACTIVE state are described.

At reception of RRCRelease message to transition the UE to RRC_IDLE or RRC_INACTIVE, UE shall attempt to camp on a suitable cell according to redirectedCarrierInfo if included in the RRCRelease message. If the UE cannot find a suitable cell, the UE is allowed to camp on any suitable cell of the indicated RAT. If the RRCRelease message does not contain the redirectedCarrierInfo, UE shall attempt to select a suitable cell on an NR carrier. If no suitable cell is found according to the above, the UE shall perform cell selection using stored information in order to find a suitable cell to camp on.

When returning to RRC_IDLE state after UE moved to RRC_CONNECTED state from camped on any cell state, UE shall attempt to camp on an acceptable cell according to redirectedCarrierInfo, if included in the RRCRelease message. If the UE cannot find an acceptable cell, the UE is allowed to camp on any acceptable cell of the indicated RAT. If the RRCRelease message does not contain redirectedCarrierInfo UE shall attempt to select an acceptable cell on an NR frequency. If no acceptable cell is found according to the above, the UE not in SNPN Access Mode shall continue to search for an acceptable cell of any PLMN in state any cell selection.

Technical features related to Any Cell Selection state are described.

This state is applicable for RRC_IDLE and RRC_INACTIVE state. In this state, the UE shall perform cell selection process to find a suitable cell. If the cell selection process fails to find a suitable cell after a complete scan of all RATs and all frequency bands supported by the UE, the UE not in SNPN Access Mode shall attempt to find an acceptable cell of any PLMN to camp on, trying all RATs that are supported by the UE and searching first for a high-quality cell.

The UE, which is not camped on any cell, shall stay in this state.

Technical features related to Camped on Any Cell state are described.

This state is only applicable for RRC_IDLE state. In this state, the UE shall perform the following tasks:

monitor Short Messages transmitted with P-RNTI over DCI;

monitor relevant System Information;

perform necessary measurements for the cell reselection evaluation procedure;

execute the cell reselection evaluation process on the following occasions/triggers:
1) UE internal triggers, so as to meet performance;
2) When information on the BCCH used for the cell reselection evaluation procedure has been modified.
    regularly attempt to find a suitable cell trying all frequencies of all RATs that are supported by the UE. If a suitable cell is found, UE shall move to camped normally state.
    if the UE supports voice services and the current cell does not support IMS emergency calls as indicated by the field ims-EmergencySupport in SIB1, the UE shall perform cell selection/reselection to an acceptable cell that supports emergency calls in any supported RAT regardless of priorities provided in system information from current cell, if no suitable cell is found.
Hereinafter, technical features related to Cell Reservations and Access Restrictions are described. Section 5.3 of 3GPP TS 36.304 v16.5.0 may be referred.

There are two mechanisms which allow an operator to impose cell reservations or access restrictions. The first mechanism uses indication of cell status and special reservations for control of cell selection and reselection procedures. The second mechanism, referred to as Unified Access Control, shall allow preventing selected access categories or access identities from sending initial access messages for load control reasons.

Unified Access Control does not apply to IAB-MTs.

Technical features related to Cell status and cell reservations are described.

Cell status and cell reservations are indicated in the MIB or SIB1 message by means of following fields:
    cellBarred (IE type: "barred" or "not barred") Indicated in MIB message. In case of multiple PLMNs or NPNs indicated in SIB1, this field is common for all PLMNs and NPNs
    cellReservedForOperatorUse (IE type: "reserved" or "not reserved") Indicated in SIB1 message. In case of multiple PLMNs or NPNs indicated in SIB1, this field is specified per PLMN or per SNPN.
    cellReservedForOtherUse (IE type: "true") Indicated in SIB1 message. In case of multiple PLMNs indicated in SIB1, this field is common for all PLMNs.
    cellReservedForFutureUse (IE type: "true")
Indicated in SIB1 message. In case of multiple PLMNs or NPNs indicated in SIB1, this field is common for all PLMNs and NPNs.
    IAB-MT ignores the cellBarred, cellReservedForOperatorUse, cellReservedForFutureUse and intraFreqReselection (i.e. treats intraFreqReselection as if it was set to allowed). IAB-MT also ignores cellReservedForOtherUse for cell barring determination (i.e. NPN capable IAB-MT considers cellReservedForOtherUse for determination of an NPN-only cell).
    iab-Support (IE type: "true")
Indicated in SIB1 message. In case of multiple PLMNs or NPNs indicated in SIB1, this field is specified per PLMN or per SNPN.
    When cell status is indicated as "not barred" and "not reserved" for operator use and not "true" for other use and not "true" for future use,
        All UEs shall treat this cell as candidate during the cell selection and cell reselection procedures.
    When cell broadcasts any CAG-IDs or NIDs and the cell status is indicated as "not barred" and "not reserved" for operator use and "true" for other use, and not "true" for future use:

All NPN-capable UEs shall treat this cell as candidate during the cell selection and cell reselection procedures, other UEs shall treat this cell as if cell status is "barred".
    When cell status is indicated as "true" for other use, and either cell does not broadcast any CAG-IDs or NIDs or does not broadcast any CAG-IDs and the UE is not operating in SNPN Access Mode,
        The UE shall treat this cell as if cell status is "barred".
    When cell status is indicated as "true" for future use,
        The UE shall treat this cell as if cell status is "barred".
    When cell status is indicated as "not barred" and "reserved" for operator use for any PLMN/SNPN and not "true" for other use and not "true" for future use,
        UEs assigned to Access Identity 11 or 15 operating in their HPLMN/EHPLMN shall treat this cell as candidate during the cell selection and reselection procedures if the field cellReservedForOperatorUse for that PLMN set to "reserved".
        UEs assigned to Access Identity 11 or 15 shall treat this cell as candidate during the cell selection and reselection procedures if the field cellReservedForOperatorUse for selected/registered SNPN is set to "reserved".
        UEs assigned to an Access Identity 0, 1, 2 and 12 to 14 shall behave as if the cell status is "barred" in case the cell is "reserved for operator use" for the registered PLMN/SNPN or the selected PLMN/SNPN.
    Access Identities 11, 15 are only valid for use in the HPLMN/EHPLMN; Access Identities 12, 13, 14 are only valid for use in the home country.
    The cell selection of another cell may also include a change of RAT.
    If barring of a cell is triggered by the condition of trackingAreaCode not being provided, the barring only applies to this PLMN and the UE can re-evaluate the barring condition again due to selection of another PLMN.

Technical features related to Unified access control are described.

The information on cell access restrictions associated with Access Categories and Identities is broadcast in SIB1 as part of Unified Access Control.

The UE shall ignore Access Category and Identity related cell access restrictions for cell reselection. A change of the indicated access restriction shall not trigger cell reselection by the UE.

The UE shall consider Access Category and Identity related cell access restrictions for NAS initiated access attempts and RNAU.

Meanwhile, in NR, the "slice info" (for a single slice or slice group) may be provided to the UE using both broadcast and dedicated signaling. The "slice info" may be provided for the serving frequency as well as neighboring frequencies.

In addition, slice-aware cell reselection may be supported. For example, the following steps are used for slice-based cell (re)selection in AS:
    Step 0: NAS layer at UE provides slice information to AS layer at UE, including slice priorities.
    Step 1: AS sorts slices in priority order starting with the highest priority slice.
    Step 2: Select slices in priority order starting with the highest priority slice.
    Step 3: For the selected slice assign priority to frequencies received from a network.
    Step 4: Starting with the highest priority frequency, perform measurements (same as legacy).
    Step 5: If the highest ranked cell is suitable and supports the selected slice in step 2 then camp on the cell and exit this sequence of operation. (For example, how the UE determines whether the highest ranked cell supports the selected slice could be discussed.)

Step 6: If there are remaining frequencies then go back to step 4.

Step 7: If the end of the slice list has not been reached go back to step 2.

Step 8: Perform legacy cell reselection.

According to this procedure, the UE performs slice-aware cell reselection to find a suitable cell for each slice (or slice group) in the slice list received from the NAS.

FIG. 14 shows an example of a network slice list for explaining the slice-aware cell reselection.

In FIG. 14, the UE may have the slice list in priority order. The highest slice priority is Slice #1 and the lowest slice priority is Slice #5. Going through the frequency list for each slice, the UE will search for a suitable cell.

For example, it may be assumed that a cell on freq-x has the best cell quality. In this case, if freq-x does not support any network slice required for the UE, the UE may not check freq-x, until the UE reaches the end of the slice list.

If the UE fails to find a suitable cell on the frequencies in the slice list, the UE will find the cell on freq-x in Step 8, while performing legacy cell reselection.

If the serving cell quality becomes lower than a threshold, the UE may transit to Any Cell state, unless the UE finds a suitable cell during the slice-aware cell reselection. Since the UE performs measurement on the frequencies only in the slice list during slice-aware cell reselection.

In the other case, where freq-x supporting 5th slice priority (that is, Slice #5) is a suitable cell, but none of the other cells supporting the top four slice priorities are not suitable, if the serving cell quality becomes bad before reaching at 5th slice priority slice-aware cell reselection, the UE will transit to Any Cell state. Then, the UE searches for a suitable cell regardless of the supporting network slice, because slice-specific cell search is currently supported in cell reselection, not in cell selection.

Therefore, if the serving cell quality becomes worse, enhancements for slice-aware cell reselection to find a suitable cell, based on cell quality regardless of the network slice, would be helpful. Otherwise, if the UE fails to find a suitable cell during slice-aware cell reselection and transit to Any Cell status, anyway the UE should search for a cell without slice information and may perform measurement from a cold start.

Therefore, studies for slice-aware cell reselection based on cell quality may be required.

Hereinafter, a method for slice-aware cell reselection in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 15:
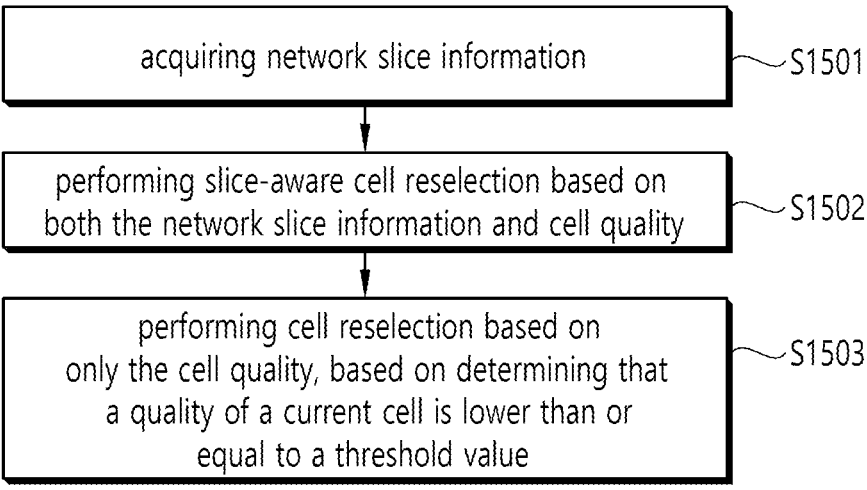
FIG. 15 shows an example of a method for slice-aware cell reselection in a wireless communication system, according to some embodiments of the present disclosure.

FIG. 15 shows an example of a method for slice-aware cell reselection in a wireless communication system, according to some embodiments of the present disclosure.

In particular, FIG. 15 shows an example of a method performed by a wireless device.

In step S1501, a wireless device may acquire network slice information.

For example, the network slice information may include frequency information for slice-aware cell reselection.

For example, the network slice information may include information on one or more network slices and information on one or more frequencies associated with each of the one or more network slices.

In step S1502, a wireless device may perform slice-aware cell reselection based on both the network slice information and cell quality.

According to some embodiments of the present disclosure, a wireless device may determine priority of each network slice, based on the network slice information. For example, the wireless device may perform the slice-aware cell reselection based on the determined priority of each network slice.

For example, the wireless device may receive application information from upper layers (for example, application usage information, user membership information from the 3rd party) to determine the priority of each network slice. For example, the wireless device may consider a network slice whose associated service has been suspended (for example, in RRC_INACTIVE).

According to some embodiments of the present disclosure, a wireless device may receive, from a network, network slice restrictions information including information on a specific area and/or a specific time period. The one or more network slices may be valid only in the specific area and/or the specific time period.

For example, the wireless device may perform the slice-aware cell reselection based on the network slice restrictions information. That is, the wireless device could determine priority of the network slice based on the network slice restrictions information. For example, is a specific network slice is not valid, the wireless device may consider the specific network slice as having the lowest priority. Then, the wireless device may perform the slice-aware cell reselection based on the determined priority of the network slices.

In step S1503, based on determining that a quality of a current cell is lower than or equal to a threshold value, a wireless device may perform cell reselection based on only the cell quality.

For example, the cell reselection based on only the cell quality may be performed without transitioning to an Any Cell state.

For example, the wireless device may receive, from a network, the threshold value via a system information block type 2 (SIB2).

According to some embodiments of the present disclosure, the wireless device may receive, from a network, frequency information including information on one or more frequencies and information on each priority of the one or more frequencies. For example, the wireless device may perform the cell reselection based on only the cell quality, based on the frequency information.

According to some embodiments of the present disclosure, the wireless device may select one or more frequencies based on each frequency priority regardless of a network slice. The wireless device may perform the cell reselection, based on only the cell quality, by considering the selected one or more frequencies.

For example, the wireless device may select a specific frequency having the highest priority. The wireless device may perform the cell reselection based on only the cell quality by considering the selected specific frequency.

According to some embodiments of the present disclosure, the wireless device may be in communication with at least one of a user equipment, a network, or an autonomous vehicle other than the wireless device.

Hereinafter, an example of a slice-aware cell reselection procedure is described.

According to some embodiments of the present disclosure, in order to implement the measurement mechanism for the slice-aware cell reselection, the UE may receive a frequency priority list with slice information for slice-aware cell reselection, and another frequency list for legacy cell reselection using cell quality regardless of slice information.

UE may also receive a threshold used in slice-aware cell reselection. During slice-aware cell reselection, if the serving cell quality is less than a threshold, the UE may additionally measure one or more frequencies received for legacy slice reselection.

FIG. 16 shows an example of frequency information for slice-aware cell reselection and frequency information for legacy cell reselection.

In FIG. 16, the frequency information for slice-aware cell reselection may include information on a network slice list. The network slice list may include one or more network slices listed in priority order. In addition, the frequency information for slice-aware cell reselection may also include information on one or more frequencies supporting each network slice.

For example, the frequency information for slice-aware cell reselection may include information on network slice #1, network slice #2, . . . , and network slice #5. In addition, the frequency information for slice-aware cell reselection may include information on (i) the frequency a and the frequency b supporting the network slice #1, (ii) the frequency c and the frequency d supporting the network slice #2, . . . , and, (iii) the frequency e and the frequency f supporting the network slice #5.

On the other hand, the frequency information for legacy cell reselection may include information on a frequency list. The frequency list may include one or more frequencies listed in priority order.

For example, the frequency information for legacy cell reselection may include information on frequency m, frequency n, . . . , and frequency z. In addition, the frequency information for legacy cell reselection may include information on the priority of each frequency.

Figure 17:
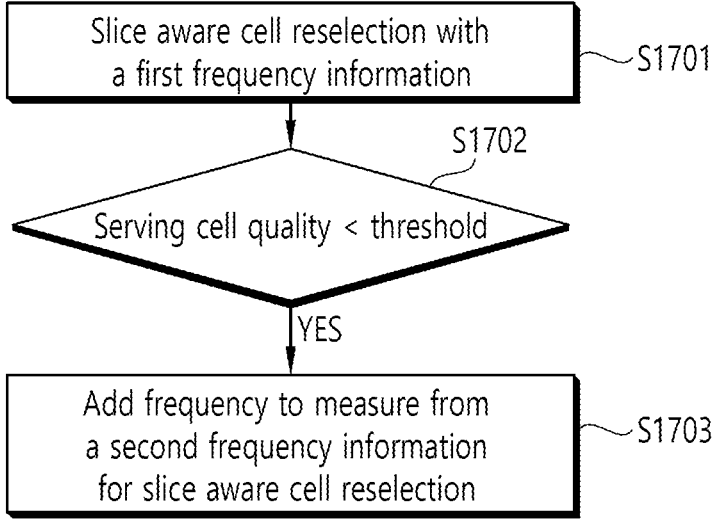
FIG. 17 shows an example of a slice-aware cell reselection procedure, according to some embodiments of the present disclosure.

FIG. 17 shows an example of a slice-aware cell reselection procedure, according to some embodiments of the present disclosure.

In step S1701, a UE may perform slice-aware cell reselection with first frequency information. The first frequency information may be the frequency information for slice-aware cell reselection in FIG. 16.

In step S1702, a UE may determine that the serving cell quality is less than a threshold.

That is, the threshold may be used by the UE for the serving cell quality during slice-aware cell reselection. For example, the threshold may be configured by the network via broadcast or dedicated RRC signalling (for example, an RRC Release message). For example, the threshold may be preconfigured. For example, the threshold may be a fixed value specified.

In step S1703, a UE may add frequency to measure from second frequency information for slice-aware cell reselection. The second frequency information may be the frequency information for legacy cell reselection in FIG. 16.

FIG. 18 shows an example of UE operations for a slice-aware cell reselection procedure.

In step S1801, the UE may receive network slice information including slice-aware cell reselection information.

For example, the network slice information may include a slice ID which is associated with one or more network slices.

For example, the slice-aware cell reselection information may include a frequency and one or more network slices supported in the frequency. The frequency priority may be included.

For example, the UE may receive slice priority list including one or more frequencies associated with each slice for slice-aware cell reselection.

For example, the UE may receive network slice information via broadcast or dedicated signalling (for example, an RRC release message and/or a NAS Registration update message).

For example, the UE may receive slice priority information via broadcast or dedicated signalling (for example, an RRC release message and/or a NAS Registration update message). For other example, the slice priority may be determined by UE with or without network side information.

In step S1802, the UE may receive a threshold to be used for the serving cell quality during slice-aware cell reselection.

For example, the UE may receive a threshold via broadcast (for example, SIB2) from the network.

For example, the UE may receive a threshold via dedicated RRC signalling (for example, an RRC Release message) from the network.

For example, the UE may be preconfigured with a threshold.

In step S1803, the UE may receive legacy cell reselection information (based on cell quality).

For example, the UE may receive carrier frequency and the corresponding frequency priority.

For example, the UE may receive carrier frequency and the corresponding one more frequency priorities (for example, subpriority).

For example, the UE may receive legacy cell reselection information via broadcast or dedicated signalling (for example, SIB and/or an RRC release message).

In step S1804, the UE may receive network slice restrictions information.

For example, the UE may receive network slice restrictions information via broadcast or dedicated signalling (for example, an RRC signalling and/or a NAS signalling).

For example, the UE may be configured with service restrictions information from upper layers or via dedicated signalling.

For example, the UE may receive the application restrictions information that a particular application is allowed to be used in a particular area.

For example, the network slice restrictions may be depending on frequencies, an area (for example, geographical area, tracking area, cell), registration of other one or more network slices, other RAT, timely manner, applications, etc.

For example, the area information may include an area ID, the associated frequency, a cell ID, coordination. For example, the area information may be information based on UE's location/positioning function.

In step S1805, the UE may determine the slice priority list.

For example, the UE may receive application information from upper layers (for example, application usage information, and user membership information from the 3rd party) to determine slice priority.

For example, the UE may consider a slice whose associated service has been suspended (for example, in RRC_I-NACTIVE).

In step S1806, the UE may perform slice-aware cell reselection.

For example, the UE may perform measurements of cells based on the slice-aware cell reselection information, if a quality of a current cell is higher than a threshold used for slice-aware cell reselection. (For example, the UE may perform measurements of cells based on the slice-aware cell reselection information, if a quality of a current cell is higher than or equal to a threshold used for slice-aware cell reselection.)

For example, the UE may select a slice (for example, the highest priority slice) and perform slice-aware cell reselection using the frequencies supporting the slice.

In step S1807, the UE may determine the serving cell quality becomes lower than a threshold used for slice-aware cell reselection.

For example, if the serving cell quality is lower than a threshold used for slice-aware cell reselection, the UE may perform measurements of cells based on the slice-aware cell reselection information and legacy cell reselection information.

For example, the UE may select one or more frequencies for extra measurement from legacy cell reselection information based on the frequency priority. The highest frequency will be chosen.

For example, the UE may select one or more frequencies for extra measurement from legacy cell reselection information based on an indication received from the network.

For example, if the serving cell quality is lower than a threshold used for slice-aware cell reselection, the UE may perform slice-aware cell reselection using frequencies configured for slice-aware cell reselection and legacy cell reselection.

In step S1808, the UE may perform cell reselection based on cell quality.

For example, if the UE cannot find a suitable cell with slice information, the UE may perform legacy cell reselection using legacy cell reselection information.

According to some embodiments of the present disclosure, a wireless device may receive cell reselection information for at least one frequency. The reselection information may include a first frequency priority information and a second frequency priority information.

The wireless device may perform measurements of cells based on the first frequency priority information, if a quality of a current cell is higher than a threshold. The measurements may be performed on the frequencies corresponding to the first frequency priority information.

The wireless device may perform measurements of cells based on the first frequency priority information and the second frequency priority information, if a quality of a current cell is not higher than a threshold (that is, the quality of the current cell is less than or equal to the threshold). The measurements may be performed on the frequencies corresponding to the first frequency priority information and one or more frequencies corresponding to the second frequency priority information.

FIG. 19 shows another example of UE operations for slice-aware cell reselection.

In step S1901, the UE may perform measurements for cell selection and reselection.

For example, the NAS can control the RAT(s) in which the cell selection should be performed, for instance by indicating RAT(s) associated with the selected PLMN, and by maintaining a list of forbidden registration area(s) and a list of equivalent PLMNs.

In step S1902, the UE may select a suitable cell based on idle mode measurements and cell selection criteria.

In order to speed up the cell selection process, stored information for several RATs may be available in the UE.

In step S1903, the UE may perform a slice-aware cell reselection procedure.

For example, the UE may acquire network slice information. The network slice information may include a slice ID which is associated with one or more network slices.

For example, the UE may acquire frequency information for slice-aware cell resection. The frequency information for slice-aware cell resection may include a frequency and one or more network slices supported in the frequency. The frequency information for slice-aware cell resection may include the frequency priority. For example, the information for slice-aware cell resection may include network slice priority list including one or more frequencies associated with each network slice for slice-aware cell reselection.

For example, the UE may perform a slice-aware cell reselection procedure, based on the network slice information and/or the frequency information for slice-aware cell resection.

In step S1904, the UE may determine that the serving cell quality becomes lower than a threshold used for slice-aware cell reselection.

For example, the UE may acquire a threshold to be used for the serving cell quality during slice-aware cell reselection.

In step S1905, based on determining that the serving cell quality becomes lower than the threshold, the UE may perform cell reselection based on cell quality.

That is, if the UE cannot find a suitable cell during the slice-aware cell reselection, the UE may perform legacy cell reselection using legacy cell reselection information. For example, the legacy cell reselection information may be the frequency information for legacy cell reselection, as described in FIG. 16.

Figure 20:
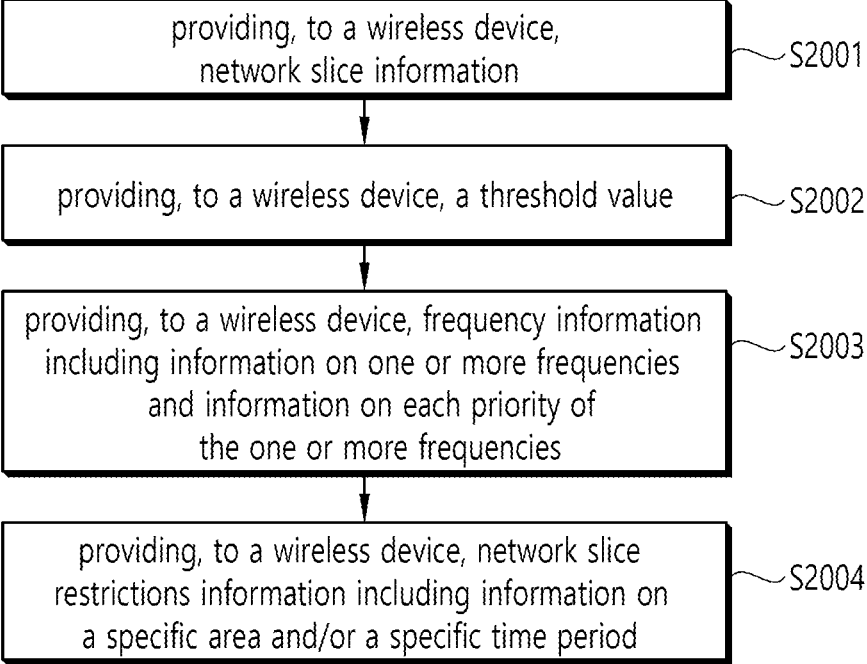
FIG. 20 shows an embodiment of a base station operations for a slice-aware cell reselection procedure.

FIG. 20 shows an embodiment of a base station operations for a slice-aware cell reselection procedure.

In step S2001, the base station may provide, to a wireless device, network slice information.

In step S2002, the base station may provide, to a wireless device, a threshold value.

In step S2003, the base station may provide, to a wireless device, frequency information including information on one or more frequencies and information on each priority of the one or more frequencies.

In step S2004, the base station may provide, to a wireless device, network slice restrictions information including information on a specific area and/or a specific time period.

Some of the detailed steps shown in the examples of FIGS. 15, 16, 17, 18, 19, and 20 may not be essential steps and may be omitted. In addition to the steps shown in FIGS. 15, 16, 17, 18, 19, and 20, other steps may be added, and the order of the steps may vary. Some of the above steps may have their own technical meaning.

Hereinafter, an apparatus for slice-aware cell reselection in a wireless communication system, according to some embodiments of the present disclosure, will be described. Herein, the apparatus may be a wireless device (100 or 200) in FIGS. 2, 3, and 5.

For example, a wireless device may perform the methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to acquire network slice information. The processor 102 may be configured to perform slice-aware cell reselection based on both the network slice information and cell quality. Based on determining that a quality of a current cell is lower than or equal to a threshold value, the processor 102 may be configured to perform cell reselection based on only the cell quality.

For example, the cell reselection based on only the cell quality may be performed without transitioning to an Any Cell state.

For example, the network slice information may include frequency information for slice-aware cell reselection.

For example, the network slice information may include information on one or more network slices and information on one or more frequencies associated with each of the one or more network slices.

For example, the processor 102 may be configured to determine priority of each network slice, based on the network slice information. In this case, the slice-aware cell reselection may be performed based on the determined priority of each network slice.

For example, the processor 102 may be configured to control the transceiver 106 to receive, from a network, frequency information including information on one or more frequencies and information on each priority of the one or more frequencies. For example, the cell reselection based on only the cell quality may be performed based on the frequency information.

For example, the processor 102 may be configured to control the transceiver 106 to receive, from a network, the threshold value via a system information block type 2 (SIB2).

For example, the processor 102 may be configured to control the transceiver 106 to receive, from a network, network slice restrictions information including information on a specific area and/or a specific time period. For example, one or more network slices may be valid only in the specific area and/or the specific time period. In this case, the slice-aware cell reselection may be performed based on the network slice restrictions information.

For example, the processor 102 may be configured to select one or more frequencies based on each frequency priority regardless of a network slice. In this case, the cell reselection based on only the cell quality may be performed by considering the selected one or more frequencies.

According to some embodiments of the present disclosure, the processor 102 may be configured to be in communication with at least one of a user equipment, a network, or an autonomous vehicle other than the wireless device.

Hereinafter, a processor for a wireless device for slice-aware cell reselection in a wireless communication system, according to some embodiments of the present disclosure, will be described.

The processor may be configured to control the wireless device to acquire network slice information. The processor may be configured to control the wireless device to perform slice-aware cell reselection based on both the network slice information and cell quality. Based on determining that a quality of a current cell is lower than or equal to a threshold value, the processor may be configured to control the wireless device to perform cell reselection based on only the cell quality.

For example, the cell reselection based on only the cell quality may be performed without transitioning to an Any Cell state.

For example, the network slice information may include frequency information for slice-aware cell reselection.

For example, the network slice information may include information on one or more network slices and information on one or more frequencies associated with each of the one or more network slices.

For example, the processor may be configured to control the wireless device to determine priority of each network slice, based on the network slice information. In this case, the slice-aware cell reselection may be performed based on the determined priority of each network slice.

For example, the processor may be configured to control the wireless device to receive, from a network, frequency information including information on one or more frequencies and information on each priority of the one or more frequencies. For example, the cell reselection based on only the cell quality may be performed based on the frequency information.

For example, the processor may be configured to control the wireless device to receive, from a network, the threshold value via a system information block type 2 (SIB2).

For example, the processor may be configured to control the wireless device to receive, from a network, network slice restrictions information including information on a specific area and/or a specific time period. For example, one or more network slices may be valid only in the specific area and/or the specific time period. In this case, the slice-aware cell reselection may be performed based on the network slice restrictions information.

For example, the processor may be configured to control the wireless device to select one or more frequencies based on each frequency priority regardless of a network slice. In this case, the cell reselection based on only the cell quality may be performed by considering the selected one or more frequencies.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for slice-aware cell reselection in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For another example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to acquire network slice information. The stored a plurality of instructions may cause the wireless device to perform slice-aware cell reselection based on both the network slice information and cell quality. Based on determining that a quality of a current cell is lower than or equal to a threshold value, the stored a plurality of instructions may cause the wireless device to perform cell reselection based on only the cell quality.

For example, the cell reselection based on only the cell quality may be performed without transitioning to an Any Cell state.

For example, the network slice information may include frequency information for slice-aware cell reselection.

For example, the network slice information may include information on one or more network slices and information on one or more frequencies associated with each of the one or more network slices.

For example, the stored a plurality of instructions may cause the wireless device to determine priority of each network slice, based on the network slice information. In this case, the slice-aware cell reselection may be performed based on the determined priority of each network slice.

For example, the stored a plurality of instructions may cause the wireless device to receive, from a network, frequency information including information on one or more frequencies and information on each priority of the one or more frequencies. For example, the cell reselection based on only the cell quality may be performed based on the frequency information.

For example, the stored a plurality of instructions may cause the wireless device to receive, from a network, the threshold value via a system information block type 2 (SIB2).

For example, the stored a plurality of instructions may cause the wireless device to receive, from a network, network slice restrictions information including information on a specific area and/or a specific time period. For example, one or more network slices may be valid only in the specific area and/or the specific time period. In this case, the slice-aware cell reselection may be performed based on the network slice restrictions information.

For example, the stored a plurality of instructions may cause the wireless device to select one or more frequencies based on each frequency priority regardless of a network slice. In this case, the cell reselection based on only the cell quality may be performed by considering the selected one or more frequencies.

According to some embodiments of the present disclosure, the stored a plurality of instructions may cause the wireless device to be in communication with at least one of a user equipment, a network, or an autonomous vehicle other than the wireless device.

Hereinafter, a base station (BS) for a slice-aware cell reselection procedure, according to some embodiments of the present disclosure, will be described.

The BS may include a transceiver, a memory, and a processor operatively coupled to the transceiver and the memory.

The processor may be configured to control the transceiver to provide, to a wireless device, network slice information. The processor may be configured to control the transceiver to provide, to a wireless device, a threshold value. The processor may be configured to control the transceiver to provide, to a wireless device, frequency information including information on one or more frequencies and information on each priority of the one or more frequencies. The processor may be configured to control the transceiver to provide, to a wireless device, network slice restrictions information including information on a specific area and/or a specific time period.

The present disclosure can have various advantageous effects.

According to some embodiments of the present disclosure, a wireless device could perform slice-aware cell reselection efficiently by considering the cell quality of the current cell.

For example, while performing the slice-aware cell reselection, if the cell quality of the current cell becomes lower than a threshold value, the wireless device could perform cell reselection regardless of the network slice. Thus, the wireless device could avoid to transition to the Any Cell state. Therefore, the wireless device could save time and power for the cell reselection procedure.

In other words, according to some embodiments of the present disclosure, the wireless device may perform measurement using the frequencies for slice-aware cell reselection and the frequencies for legacy cell reselection, if the serving cell quality is lower than a threshold.

That is, the wireless device could find a suitable based on cell quality regardless of the network slice, during slice-aware cell reselection, before entering into the Any Cell state.

Therefore, the wireless device could save power consumption by avoiding the cold start measurement.

In addition, the wireless device could save the time for searching cell in the Any Cell selection. In other words, the wireless device could reduce the latency to be consumed for cell search in the Any Cell selection.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising, receiving, by a wireless device from a network, first information related to slice-based cell reselection, wherein the first information related to slice-based cell reselection includes (i) priority of frequency, (ii) information related to one or more slices, and (iii) information related to at least one frequency which is associated with each slice;

receiving, by the wireless device from the network, information related to a threshold value for a quality of a serving cell via a system information block type 2;

receiving, by the wireless device from the network, second information related to cell reselection regardless of a slice;

receiving, by the wireless device from the network, slice restriction information including information related to a specific area and/or a specific time period, wherein one or more slices are valid only in the specific area and/or the specific time period; and based on that a cell reselection procedure is initiated, determining, by the wireless device, whether to consider a slice for the cell reselection procedure based on a quality of the serving cell;

based on a quality of the serving cell is higher than or equal to the threshold value:

selecting, by the wireless device, a valid slice for a suspended service among the one or more slices based on the slice restriction information;

performing, by the wireless device, a slice-based cell reselection procedure based on (i) measurement results for cells of one or more frequencies which support the selected valid slice and (ii) the first information;

based on the quality of the serving cell is lower than the threshold value:

performing, by the wireless device, a cell reselection procedure regardless of a slice without transitioning to an any cell state, based on (i) measurement results for cells of one or more frequencies regardless of a slice and (ii) the second information.

2. The method of claim 1, wherein the wireless device is in communication with at least one of a user equipment, a network, or an autonomous vehicle other than the wireless device.

3. A wireless device, comprising:

a transceiver;

a memory; and at least one processor operatively coupled to the transceiver and the memory, and configured to perform operations, the operations comprising:

receiving, from a network, first information related to slice-based cell reselection, wherein the first information related to slice-based cell reselection includes (i) priority of frequency, (ii) information related to one or more slices, and (iii) information related to at least one frequency which is associated with each slice;

receiving, from the network, information related to a threshold value for a quality of a serving cell via a system information block type 2;

receiving, from the network, second information related to cell reselection regardless of a slice;

receiving, from the network, slice restriction information including information related to a specific area and/or a specific time period, wherein one or more slices are valid only in the specific area and/or the specific time period; and based on that a cell reselection procedure is initiated, determining whether to consider a slice for the cell reselection procedure based on a quality of the serving cell;

based on a quality of the serving cell is higher than or equal to the threshold value:

selecting a valid slice for a suspended service among the one or more slices based on the slice restriction information;

performing a slice-based cell reselection procedure based on (i) measurement results for cells of one or more frequencies which support the selected valid slice and (ii) the first information;

based on the quality of the serving cell is lower than the threshold value:

performing a cell reselection procedure regardless of a slice without transitioning to an any cell state, based on (i) measurement results for cells of one or more frequencies regardless of a slice and (ii) the second information.

4. A non-transitory computer-readable medium having stored thereon a plurality of instructions, which, when executed by a processor of a wireless device, cause the wireless device to perform operations, the operations comprise, receiving, from a network, first information related to slice-based cell reselection, wherein the first information related to slice-based cell reselection includes (i) priority of frequency, (ii) information related to one or more slices, and (iii) information related to at least one frequency which is associated with each slice;

receiving, from the network, information related to a threshold value for a quality of a serving cell via a system information block type 2;

receiving, from the network, second information related to cell reselection regardless of a slice;

receiving, from the network, slice restriction information including information related to a specific area and/or a specific time period, wherein one or more slices are valid only in the specific area and/or the specific time period; and based on that a cell reselection procedure is initiated, determining whether to consider a slice for the cell reselection procedure based on a quality of the serving cell;

based on a quality of the serving cell is higher than or equal to the threshold value:

selecting a valid slice for a suspended service among the one or more slices based on the slice restriction information;

performing a slice-based cell reselection procedure based on (i) measurement results for cells of one or more frequencies which support the selected valid slice and (ii) the first information;

based on the quality of the serving cell is lower than the threshold value:

performing a cell reselection procedure regardless of a slice without transitioning to an any cell state, based on (i) measurement results for cells of one or more frequencies regardless of a slice and (ii) the second information.

* * * * *